US010103855B2

(12) United States Patent
Chen et al.

(10) Patent No.: US 10,103,855 B2
(45) Date of Patent: Oct. 16, 2018

(54) FLEXIBLE CHANNEL STATE INFORMATION FEEDBACK MANAGEMENT

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/617,363

(22) Filed: Feb. 9, 2015

(65) Prior Publication Data

US 2015/0280877 A1    Oct. 1, 2015

Related U.S. Application Data

(60) Provisional application No. 61/972,023, filed on Mar. 28, 2014.

(51) Int. Cl.
*H04L 5/00* (2006.01)
*H04W 24/10* (2009.01)

(52) U.S. Cl.
CPC .......... *H04L 5/0048* (2013.01); *H04L 5/0057* (2013.01); *H04W 24/10* (2013.01)

(58) Field of Classification Search
CPC ..... H04L 5/0048; H04L 5/0057; H04L 5/003; H04L 5/0035; H04L 5/0053;
(Continued)

(56) References Cited

U.S. PATENT DOCUMENTS

2013/0208604 A1* 8/2013 Lee .................. H04L 25/0226
370/252
2014/0016549 A1* 1/2014 Novlan ............... H04B 7/0417
370/328

(Continued)

OTHER PUBLICATIONS

Huawei et al., "Discuss on Pc for CoMP operation", Oct. 8-12, 2012, 3GPP, 3GPP TSG RAN WG1 Meeting #70bis San Diego USA, R1-124074 (Year: 2012).*

(Continued)

*Primary Examiner* — Ricky Q Ngo
*Assistant Examiner* — Michael K Phillips
(74) *Attorney, Agent, or Firm* — Holland & Hart LLP

(57) ABSTRACT

One method includes receiving at a user equipment (UE) information associated with two or more interference measurement resources (IMRs) for a channel state information (CSI) process, the information comprising an allocation of the two or more IMRs for the CSI process and a plurality of management configurations for use of the two or more IMRs; and using the two or more IMRs in accordance with the plurality of management configurations to perform one or both of channel measurement and CSI reporting. Another method includes transmitting information associated with two or more IMRs for a CSI process, the information comprising an allocation of the two or more IMRs for the CSI process and a plurality of management configurations for use of the two or more IMRs; and receiving at least one CSI report based on at least one of the two or more IMRs.

30 Claims, 19 Drawing Sheets

(58) Field of Classification Search
CPC ... H04L 5/0073; H04L 5/0094; H04L 1/0026; H04L 72/0406; H04W 24/10; H04W 72/04; H04W 72/082; H04W 24/08; H04W 72/042; H04W 72/0406; H04W 24/02; H04B 7/024; H04B 7/0626; H04B 7/0417; H04B 17/345

See application file for complete search history.

(56) References Cited

U.S. PATENT DOCUMENTS

| | | | | |
|---|---|---|---|---|
| 2014/0044061 A1* | 2/2014 | Yue | ................... | H04W 72/042 370/329 |
| 2014/0256341 A1* | 9/2014 | Nayeb Nazar | ...... | H04W 72/082 455/452.1 |
| 2015/0092768 A1* | 4/2015 | Ng | ................... | H04W 48/16 370/350 |
| 2015/0098346 A1* | 4/2015 | Guo | ................... | H04B 7/0478 370/252 |
| 2015/0162966 A1* | 6/2015 | Kim | ................... | H04B 17/00 370/252 |
| 2015/0215018 A1* | 7/2015 | Xiong | ................... | H04W 24/10 370/329 |
| 2015/0215022 A1* | 7/2015 | Nagata | ................... | H04L 5/001 370/329 |
| 2015/0270917 A1* | 9/2015 | Roman | ................... | H04J 11/005 370/329 |
| 2015/0358094 A1* | 12/2015 | Yi | ................... | H04B 17/318 370/252 |
| 2015/0358139 A1* | 12/2015 | Li | ................... | H04W 72/08 370/252 |
| 2015/0381254 A1* | 12/2015 | Liang | ................... | H04B 7/024 370/329 |
| 2016/0036571 A1* | 2/2016 | Park | ................... | H04B 7/024 370/330 |
| 2016/0366007 A1* | 12/2016 | Hwang | ................... | H04L 27/3809 |
| 2017/0170940 A1* | 6/2017 | Lee | ................... | H04L 5/0057 |

OTHER PUBLICATIONS

IPEA/EPO, Second Written Opinion of the International Preliminary Examining Authority, Int'l. App. No. PCT/US2015/015196, dated Mar. 31, 2016, European Patent Office, Munich, DE, 6 pgs.

ISA/EPO, International Search Report and Written Opinion of the International Searching Authority, Int'l. App. No. PCT/US2015/015196, dated Apr. 20, 2015, European Patent Office, Rijswijk, NL, 10 pgs.

LG Electronics, "CSI Measurement and Report for TDD eIMTA," 3GPP TSG RAN WG1 Meeting #74, Barcelona, Spain, Aug. 19-23, 2013, R1-133364, URL: http://www.3gpp.org/DynaReport/TDocExMtg--R1-74--30044.htm, 3rd Generation Partnership Project.

Renesas Mobile Europe Ltd., "CSI Measurement and Reporting in TDD eIMTA," 3GPP TSG RAN WG1 Meeting #74bis, Guangzhou, China, Oct. 7-11, 2013, R1-134476, URL: http://www.3gpp.org/DynaReport/TDocExMtg--R1-74b--30045.htm, 3rd Generation Partnership Project.

* cited by examiner

FLEXIBLE CHANNEL STATE INFORMATION FEEDBACK MANAGEMENT

CROSS REFERENCES

The present Application for Patent claims priority to U.S. Provisional Patent Application No. 61/972,023 by Chen et al., entitled "Flexible Channel State Information Feedback Management," filed Mar. 28, 2014, assigned to the assignee hereof.

BACKGROUND

Field of the Disclosure

The present disclosure relates to wireless communication systems, for example, and more particularly to flexible channel state information feedback management.

Description of the Related Art

Wireless communication systems are widely deployed to provide various communication services such as voice, video, packet data, messaging, broadcast, and the like. These wireless communication systems may be multiple-access systems capable of supporting multiple users by sharing the available system (e.g., network) resources.

A wireless communication system may include a number of base stations that can support communication for a number of user equipments (UEs). A UE may communicate with a base station via downlink (DL) and uplink (UL) transmissions. The DL (or forward link) refers to the communication link from the base station to the UE, and the UL (or reverse link) refers to the communication link from the UE to the base station.

Multiple access technologies may use Frequency Division Duplex (FDD) or Time Division Duplex (TDD) to provide UL and DL communications over one or more carriers. TDD operation offers flexible deployments without requiring paired spectrum resources. TDD formats include transmission of frames of data, each including a number of different subframes in which different subframes may be UL subframes or DL subframes. In systems that operate using TDD, different formats may be used in which uplink and downlink communications may be symmetric or asymmetric. Flexible TDD DL/UL subframe configurations provide efficient ways to use unpaired spectrum resources. In some examples, TDD subframe configurations may be adapted based on traffic conditions (e.g., DL/UL loading at a base station and/or UE).

Wireless communication systems including base stations and UEs may support operation on multiple carriers, which in one form is called carrier aggregation. Carrier aggregation may be used to increase throughput between a base station supporting multiple component carriers and a UE, and UEs may be configured to communicate using multiple component carriers associated with multiple base stations. Other techniques for increasing throughput using multiple carriers may be used where base stations performing joint operations have non-ideal backhaul (e.g., dual-connectivity, etc.).

In some instances, a wireless communication system may support a channel state information (CSI) process in which two interference measurement resources (IMRs) are allocated for the CSI process.

SUMMARY

The described features generally relate to one or more improved methods, apparatuses, systems, and/or devices for wireless communication. More particularly, the described features relate to methods, apparatuses, systems, and/or devices for managing an allocation of two or more interference measurement resources (IMRs) for a channel state information (CSI) process. In some examples, the two or more IMRs may be associated with a plurality of management configurations and each of the plurality of management configurations may be separately indicated for each of the two or more IMRs. In other examples, the two or more IMRs may be associated with a plurality of management configurations. At least one of the plurality of management configurations may be separately indicated for the two or more IMRs, and at least one of the plurality of management configurations may be jointly indicated for the two or more IMRs. In other examples, the two or more IMRs may be associated with a plurality of management configurations and all of the plurality of management configurations may be jointly indicated for the two or more IMRs. The described features also relate to methods, apparatuses, systems, and/or devices in which one or more CSI feedback values may be inherited by an IMR from a reference IMR. CSI feedback value inheritance may be used to provide some correlation between CSI reporting based on different IMRs for a CSI process.

In a first set of illustrative examples, a method for wireless communication is described. In one configuration, the method includes receiving at a UE information associated with a CSI process, the information comprising an allocation of two or more IMRs for the CSI process and a plurality of management configurations for use of the two or more IMRs; and using the two or more IMRs in accordance with the plurality of management configurations to perform one or both of channel measurement and CSI reporting.

In some examples of the method, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the two or more IMRs may each be associated with one or more subframe sets associated with the CSI process. In some examples, the plurality of management configurations may be associated with a downlink transmission mode configured for the UE.

In some examples of the method, the plurality of management configurations may include a CSI reporting mode, a channel quality indication (CQI) table, an energy per resource element (EPRE) ratio, and a reporting restriction parameter. In some cases, the CQI table may include at least one of a legacy CQI table and a new CQI table, wherein the new CQI table supports higher spectral efficiencies than the legacy CQI table. In some cases, the EPRE ratio may be a ratio of physical downlink shared channel (PDSCH) EPRE to channel state information reference signal (CSI-RS) EPRE. In some cases, the reporting restriction parameter may be a parameter that restricts a set of vectors or ranks that are reportable by the UE. In some cases, the reporting restriction parameter may be a codebookSubsetRestriction parameter. In some cases, the plurality of management configurations may be separately indicated for the two or more IMRs. In some cases, at least one of the plurality of management configurations may be separately indicated for the two or more IMRs, and at least one of the plurality of management configurations may be jointly indicated for the two or more IMRs. In some cases, the CSI reporting mode, the CQI table and the reporting restriction parameter may be separately indicated for the two or more IMRs and the EPRE ratio may be jointly indicated for the two or more IMRs. In some cases, the reporting restriction parameter may be separately indicated for the two or more IMRs and the CSI reporting mode, the CQI table, and the EPRE ratio are jointly indicated for the two or more IMRs.

In some examples, the method may include receiving an indication that one of the two or more IMRs is a reference IMR. In some cases, the at least one of the two or more IMRs may inherit at least one CSI feedback value from the reference IMR. In some cases, the at least one CSI feedback value inherited from the reference IMR may include a rank. In some cases, the at least one CSI feedback value inherited from the reference IMR may include a CSI reporting mode.

In some examples of the method, the UE may be configured to use evolved interference management for traffic adaptation (eIMTA). In some examples of the method, the UE may be configured to use network assisted interference cancellation and suppression (NAICS) operations.

In some examples of the method, at least two of the two or more IMRs may be configured in overlapped subframes. In some examples of the method, the method may include receiving a downlink control channel to trigger the CSI reporting.

In a second set of illustrative examples, an apparatus for wireless communication is described. In one configuration, the apparatus may include means for receiving at a UE information associated with a CSI process, the information comprising an allocation of two or more IMRs for the CSI process and a plurality of management configurations for use of the two or more IMRs; and means for using the two or more IMRs in accordance with the plurality of management configurations to perform one or both of channel measurement and CSI reporting. In some examples, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to receive at a UE information associated with a CSI process, the information comprising an allocation of two or more IMRs for the CSI process and a plurality of management configurations for use of the two or more IMRs; and use the two or more IMRs in accordance with the plurality of management configurations to perform one or both of channel measurement and CSI reporting. In some examples, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the instructions may also be executable by the processor to implement one or more aspects of the method for wireless communication described above with respect to the first set of illustrative examples.

In a fourth set of illustrative examples, a computer program product for communication by a wireless communication apparatus in a wireless communication system is described. In one configuration, the computer program product may include a non-transitory computer-readable medium storing instructions executable by a processor to cause the wireless communication apparatus to receive at a UE information associated with a CSI process, the information comprising an allocation of two or more IMRs for the CSI process and a plurality of management configurations for use of the two or more IMRs; and use the two or more IMRs in accordance with the plurality of management configurations to perform one or both of channel measurement and CSI reporting. In some examples, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the instructions may also be executable by the processor to cause the wireless communication apparatus to implement one or more aspects of the method for wireless communication described above with respect to the first set of illustrative examples.

In a fifth set of illustrative examples, another method for wireless communication is described. In one configuration, the method includes transmitting information associated with a CSI process, the information comprising an allocation of two or more IMRs for the CSI process and a plurality of management configurations for use of the two or more IMRs; and receiving at least one CSI report based on at least one of the two or more IMRs.

In some examples of the method, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs.

In some examples of the method, the plurality of management configurations may include a CSI reporting mode, a CQI table, an EPRE ratio, and a reporting restriction parameter.

In some examples, the method may include transmitting an indication that one of the two or more IMRs is a reference IMR. In some cases, at least one of the two or more IMRs may inherit at least one CSI feedback value from the reference IMR.

In some examples, the method may be performed by a base station configured to use eIMTA. In some examples, the method may be performed by a base station configured to use NAICS operations.

In some examples of the method, at least two of the two or more IMRs may be configured in overlapped subframes. In some examples of the method, the method may include transmitting a downlink control channel to trigger the CSI reporting.

In a sixth set of illustrative examples, another apparatus for wireless communication is described. In one configuration, the apparatus may include means for transmitting information associated with a CSI process, the information comprising an allocation of two or more IMRs for the CSI process and a plurality of management configurations for use of the two or more IMRs; and means for receiving at least one CSI report based on at least one of the two or more IMRs. In some examples, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor, memory in electronic communication with the processor, and instructions stored in the memory. The instructions may be executable by the processor to transmit information associated with a CSI process, the information comprising an allocation of two or more IMRs for the CSI process and a plurality of management configurations for use of the two or more IMRs; and receive at least one CSI report based on at least one of the two or more IMRs. In some examples, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the instructions may also be executable by the processor to implement one or more aspects of the method for wireless communication described above with respect to the fifth set of illustrative examples.

In an eighth set of illustrative examples, another computer program product for communication by a wireless communication apparatus in a wireless communication system is described. The computer program product may include a non-transitory computer-readable medium storing instructions executable by a processor to cause the wireless communication apparatus to transmit information associated with a CSI process, the information comprising an allocation of two or more IMRs for the CSI process and a plurality of management configurations for use of the two or more IMRs; and receive at least one CSI report based on at least one of the two or more IMRs. In some examples, all of the plurality of management configurations may be separately indicated for the two or more IMRs. In other examples, at least one of the plurality of management configurations may be separately indicated for the two or more IMRs and at least one of the plurality of management configurations may be jointly indicated for the two or more IMRs. In some examples, the instructions may also be executable by the processor to cause the wireless communication apparatus to implement one or more aspects of the method for wireless communication described above with respect to the fifth set of illustrative examples.

The foregoing has outlined rather broadly the features and technical advantages of examples according to the disclosure in order that the detailed description that follows may be better understood. Further scope of the applicability of the described methods and apparatuses will become apparent from the following detailed description, claims, and drawings. The detailed description and specific examples are given by way of illustration, since various changes and modifications within the spirit and scope of the description will become apparent to those skilled in the art.

BRIEF DESCRIPTION OF THE DRAWINGS

A further understanding of the nature and possible advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
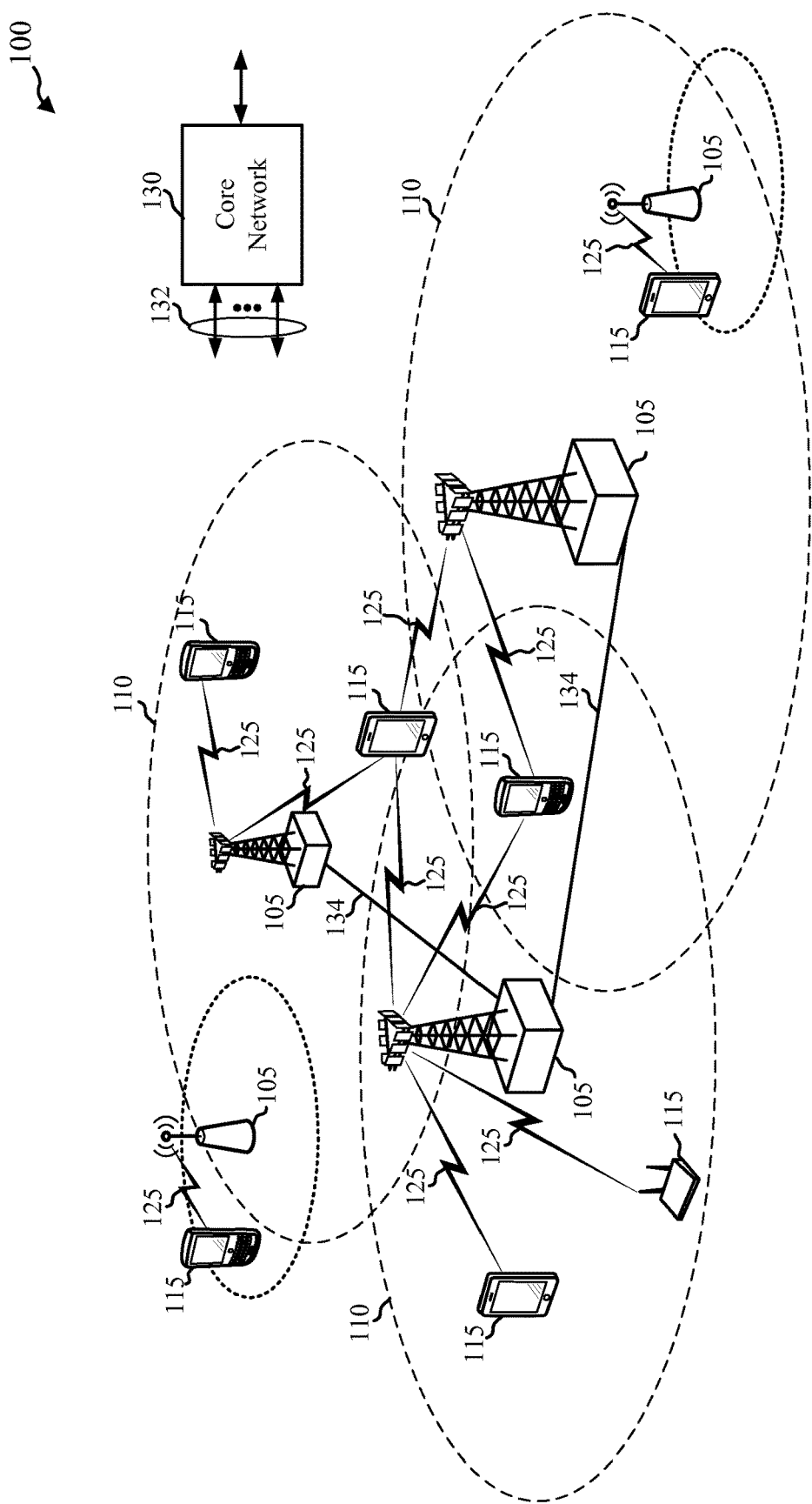
FIG. 1 shows a diagram of an example of a wireless communication system, in accordance with various aspects of the present disclosure.

Described embodiments are directed to methods, apparatus, systems, and devices for managing a channel station information (CSI) process, and more particularly, for managing a CSI process associated with an allocation of two or more interference measurement resources (IMRs). In wireless communications, CSI at a user equipment (UE) may be reported back to a base station. The CSI may include a channel quality indicator, a precoding matrix indicator, a precoding type indicator, and/or a rank indicator. The CSI reported by the UE may correspond to a CSI process configured by higher layers. A UE may be configured with one or more CSI processes per serving cell and each CSI process may be associated with a CSI-interference measurement (CSI-IM) resource (also known as an IMR). In case of carrier aggregation and/or coordinated multi-point (CoMP) operation, a UE may need to manage two or more CSI processes (e.g., two or more processes for acquiring channel measurements and generating one or more CSI reports for return to base station). Thus, the described embodiments provide ways to manage an allocation of two or more IMRs for a CSI process. In some examples, the two or more IMRs may be associated with a plurality of management configurations and the plurality of management configurations may be separately indicated for the two or more IMRs. In other examples, the two or more IMRs may be associated with a plurality of management configurations, at least one of the plurality of management configurations may be separately indicated for the two or more IMRs, and at least another one of the plurality of management configurations may be jointly indicated for the two or more IMRs. In other examples, the two or more IMRs may be associated with a plurality of management configurations and all of the plurality of management configurations may be jointly indicated for the two or more IMRs.

Some of the described embodiments also provide ways to provide some correlation between CSI reporting based on different IMRs for a CSI process. For example, one or more CSI feedback values may be inherited by an IMR from a reference IMR. The use of inheritance to enforce a common CSI feedback value across different IMRs for a CSI process may provide a more dynamic method of enforcing a common CSI feedback value (e.g., a more dynamic enforcement method than semi-statically enforcing a common CSI feedback value via a jointly indicated codebookSubsetRestriction).

Techniques described herein may be used for various wireless communication systems such as cellular wireless systems, Peer-to-Peer wireless communications, wireless local access networks (WLANs), ad hoc networks, satellite communications systems, and other systems. The terms "system" and "network" are often used interchangeably. These wireless communication systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications may be conducted according to a standardized implementation of one or more radio communication technologies called a Radio Access Technology (RAT). A wireless communication system or network that implements a Radio Access Technology may be referred to as a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communication system 100, in accordance with various aspects of the present disclosure. The wireless communication system 100 may include base stations (or cells) 105, UEs 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The wireless communication system 100 may support operation on multiple carriers (e.g., waveform signals of different frequencies). Multi-carrier transmitters can transmit modulated signals simultaneously on the multiple carriers. For example, each of the communication links 125 may be a multi-carrier signal modulated according to the various radio technologies described above. Each modulated signal may be sent on a different carrier and may carry control information (e.g., reference signals, control channels, etc.), overhead information, data, etc. The wireless communication system 100 may also support dynamic adaptation of one or more of the carriers or communication links 125. When the communication links 125 are dynamically adapted, timing systems used by the UEs 115 may need to be adjusted in order to avoid interference. In some examples, the wireless communication system 100 may further support a CSI process, wherein the UEs 115 may transmit CSI reports to the base stations 105. The CSI process may be facilitated by the allocation of IMRs to the UEs 115.

The base stations 105 may wirelessly communicate with the UEs 115 via one or more base station antennas. Each of the base stations 105 may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station may be divided into sectors making up a portion of the coverage area (not shown). The wireless communication system 100 may include base stations 105 of different types (e.g., macro, micro, and/or pico base stations). There may be overlapping coverage areas for different technologies.

The UEs 115 may be dispersed throughout the wireless communication system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a communication device, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro base stations, pico base stations, femto base stations, relay base stations, and the like.

The communication links 125 shown in wireless communication system 100 may include uplink (UL) communication links (i.e., uplinks) from a UE 115 to a base station 105, and/or downlink (DL) communication links (i.e., downlinks), from a base station 105 to a UE 115. The downlinks may also be called forward links, while the uplinks may also be called reverse links.

In embodiments, the wireless communication system 100 may include an LTE/LTE-A network. In LTE/LTE-A networks, the terms eNB and UE may be generally used to describe the base stations 105 and UEs 115, respectively. The wireless communication system 100 may in some examples include a Heterogeneous LTE/LTE-A network in which different types of eNBs provide coverage for various geographical regions. For example, each eNB may provide communication coverage for a macro cell, a pico cell, a femto cell, and/or other types of cell. A macro cell may generally cover a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. An eNB for a femto cell may be referred to as a femto eNB or a home eNB. An eNB may support one or multiple (e.g., two, three, four, and the like) cells.)

Figure 2:
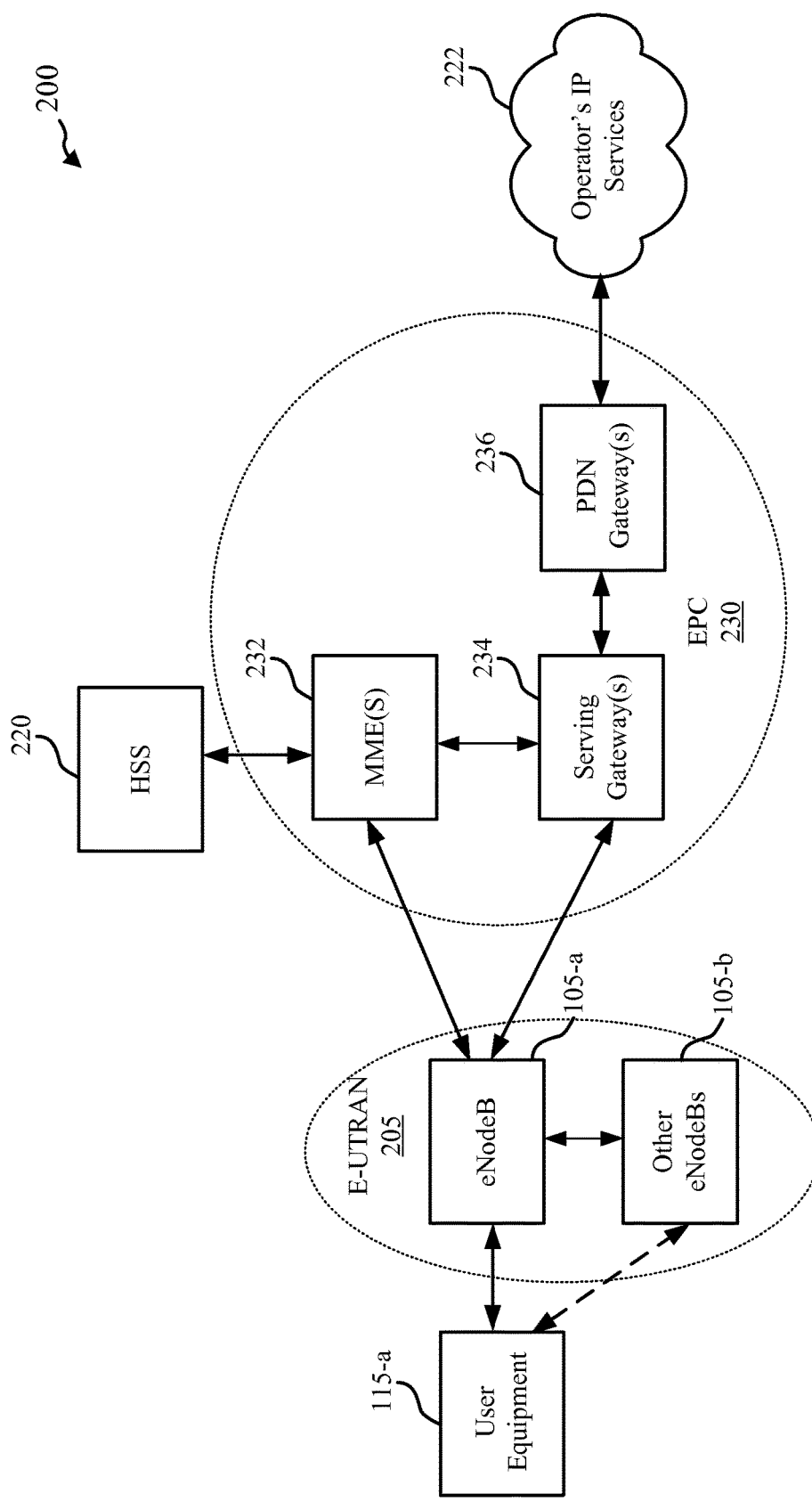
FIG. 2 shows a diagram illustrating a Long Term Evolution (LTE)/LTE-Advanced (LTE-A) network architecture, in accordance with various aspects of the present disclosure.

FIG. 2 shows a diagram illustrating an LTE/LTE-A network architecture 200, in accordance with various aspects of the present disclosure. The LTE/LTE-A network architecture 200 may be referred to as an Evolved Packet System (EPS). An EPS may include one or more UEs 115-a, an Evolved UMTS Terrestrial Radio Access Network (E-UTRAN) 205, an Evolved Packet Core (EPC)), a Home Subscriber Server (HSS) 220, and an Operator's IP Services 222. The EPS may interconnect with other access networks using other Radio Access Technologies. For example, the EPS may interconnect with a UTRAN-based network and/or a CDMA-based network via one or more Serving GPRS Support Nodes (SGSNs). To support mobility of UEs 115 and/or load balancing, the EPS may support handover of UEs 115 between a source eNB including a base station 105 and a target eNB including a base station 105. The EPS may support intra-RAT handover between eNBs and/or base stations 105 of the same RAT (e.g., other E-UTRAN networks), and inter-RAT handovers between eNBs and/or base stations 105 of different RATs (e.g., E-UTRAN to CDMA, etc.). The EPS may generally provide packet-switched services, however, as those skilled in the art will readily appreciate, the various concepts presented throughout this disclosure may be extended to networks providing circuit-switched services.

The E-UTRAN may include the eNBs, including base stations 105, and may provide user plane and control plane protocol terminations toward the UEs 115. The eNBs and their respective base stations 105 may be connected to other eNBs and their respective base stations 105 via backhaul links 134 of FIG. 1 (e.g., links established using X2 interfaces or the like). The eNBs and their base stations 105 may provide access points to the EPC 230 for the UEs 115. The eNBs and/or base stations 105 may also or alternately be connected via backhaul links 132 of FIG. 1 (e.g., links established using S1 interfaces or the like) to the EPC 230. Logical nodes within the EPC 230 may include one or more Mobility Management Entities (MMEs) 232, one or more Serving Gateways 234, and one or more Packet Data Network (PDN) Gateways 236. For example, the MME may provide bearer and connection management. All user IP packets may be transferred through the Serving Gateway 234, which itself may be connected to the PDN Gateway 236. The PDN Gateway 236 may provide UE IP address allocation as well as other functions. The PDN Gateway 236 may be connected to IP networks and/or the operator's IP Services. These logical nodes may be implemented in separate physical nodes or one or more may be combined in a single physical node. The IP Networks/Operator's IP Services 222 may include the Internet, an Intranet, an IP Multimedia Subsystem (IMS), and/or a Packet-Switched (PS) Streaming Service (PSS).

The UEs 115 and base stations 105 may be configured to collaboratively communicate through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

Generally, CoMP techniques utilize backhaul links 132 and/or 134 (of FIG. 1) for communication between base stations 105 to coordinate control plane and user plane communications for the UEs 115.

Figure 3:
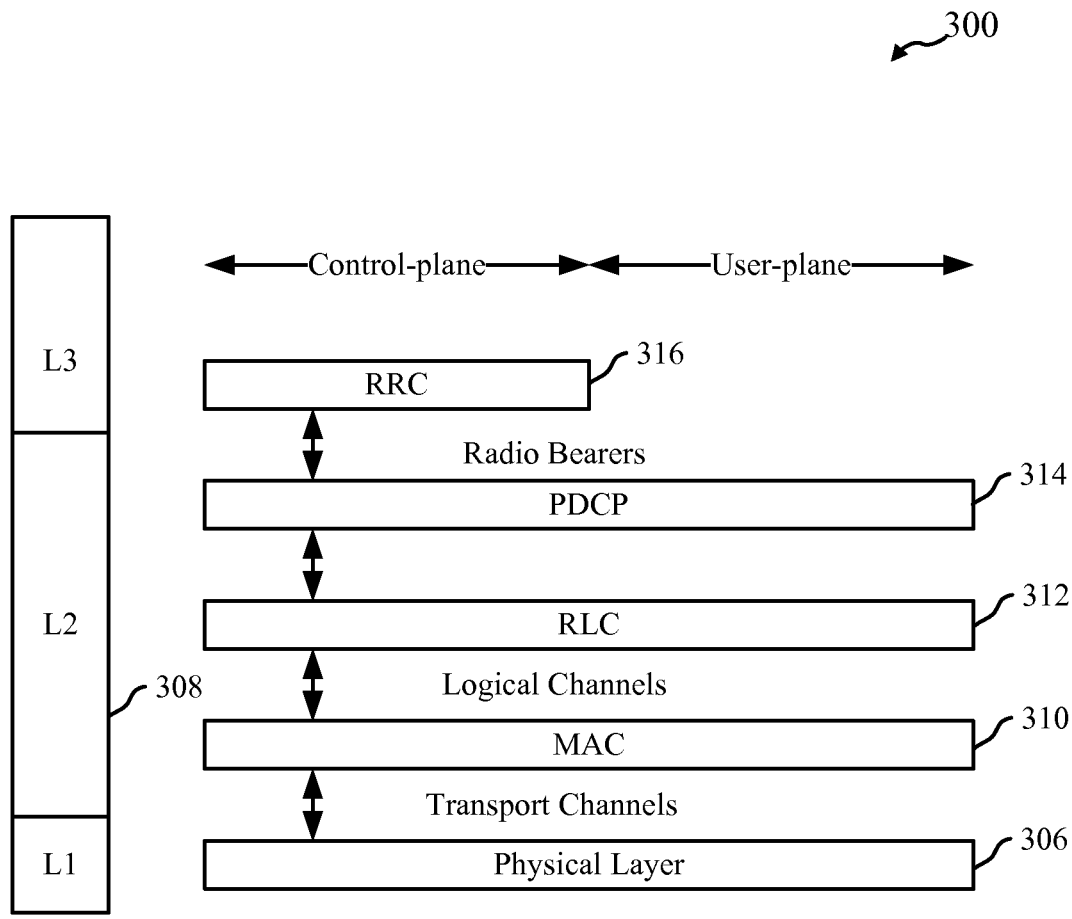
FIG. 3 shows a diagram illustrating an example of a radio protocol architecture for the user and control planes in LTE/LTE-A.

FIG. 3 shows a diagram illustrating an example of a radio protocol architecture 300 for the user and control planes in LTE/LTE-A. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) layer 312, and a packet data convergence protocol (PDCP) 314 sublayer, which are terminated at the eNB on the network side. Although not shown, the UE may have several upper layers above the L2 layer 308 including a network layer (e.g., IP layer) that may be terminated at the PDN gateway 236 on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARM). The RLC sublayer 312 passes data to the MAC sublayer 310 as logical channels.

Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is used by UEs that receive MBMS. Dedicated control channel (DCCH) is another logical control channel that is a point-to-point bi-directional channel transmitting dedicated control information, such as user-specific control information used by the UE having an RRC connection. Common control channel (CCCH) is also a logical control channel that may be used for random access information. Logical traffic channels may comprise a dedicated traffic channel (DTCH), which is a point-to-point bi-directional channel dedicated to one UE for the transfer of user information. Also, a multicast traffic channel (MTCH) may be used for point-to-multipoint downlink transmission of traffic data.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. The MAC sublayer formats and sends the logical channel data to the physical layer 306 as transport channels.

The DL transport channels may include a broadcast channel (BCH), a DL shared data channel (DL-SCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels. In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

In the control plane, the radio protocol architecture for the UE and eNB is substantially the same for the physical layer 306 and the L2 layer 308 with the exception that there is no header compression function for the control plane. The control plane also includes a RRC sublayer 316 in Layer 3 (L3 layer). The RRC sublayer 316 is responsible for obtaining radio resources (i.e., radio bearers) and for configuring the lower layers using RRC signaling between the eNB and the UE.

Figure 4A:
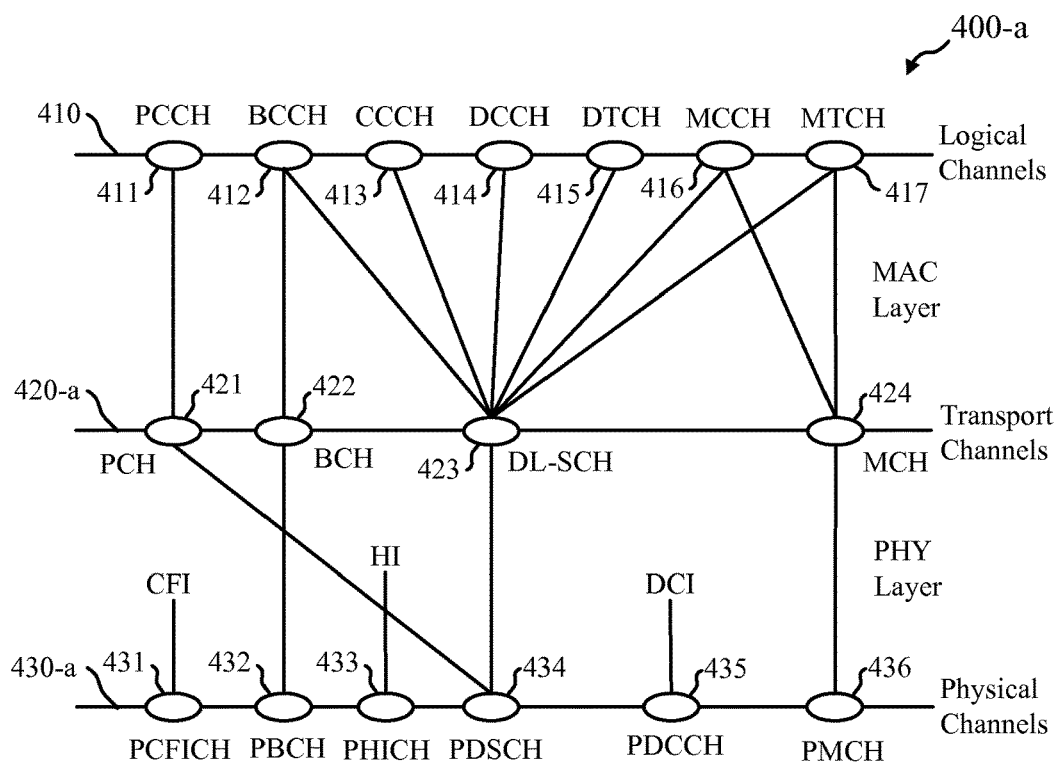
FIG. 4A and FIG. 4B illustrate channelization hierarchy that may be used in wireless communications system, in accordance with various aspects of the present disclosure.
Figure 4B:
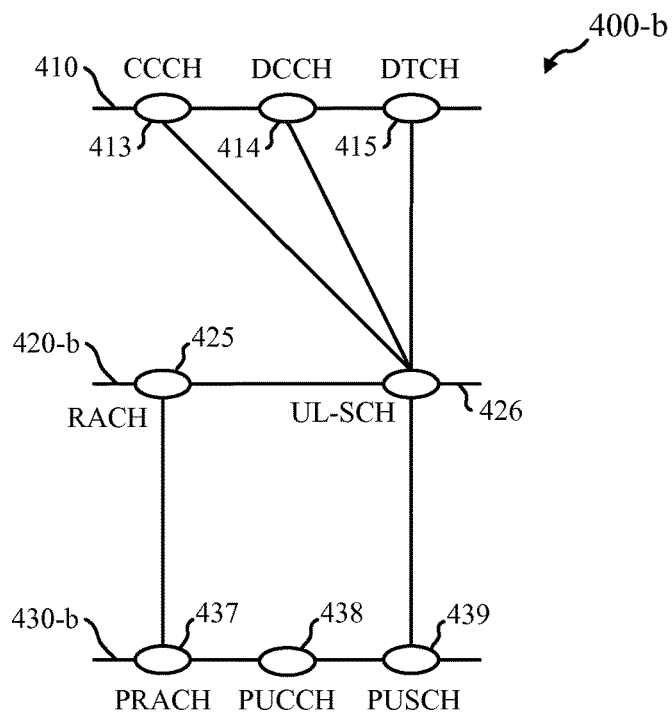

FIG. 4A and FIG. 4B illustrate channelization hierarchy that may be used in wireless communications system, in accordance with various aspects of the present disclosure. Downlink channelization hierarchy 400-*a* may illustrate, for example, channel mapping between logical channels 410, downlink transport channels 420-*a*, and downlink physical channels 430-*a* of an LTE/LTE-A network. Logical channels 410 may be classified into Control Channels and Traffic Channels. Logical control channels may include a PCCH 411, which is the downlink channel that transfers paging information, a BCCH 412, which is the downlink channel for broadcasting system control information, and a MCCH 416, which is a point-to-multipoint downlink channel used for transmitting MBMS scheduling and control information for one or several MTCHs 417.

For example, after establishing RRC connection, MCCH is used by UEs that receive MBMS. DCCH 414 is another logical control channel that is a point-to-point bi-directional channel transmitting dedicated control information, such as user-specific control information used by a UE having an RRC connection. CCCH 413 is also a logical control channel that may be used for random access information. Logical traffic channels may comprise a DTCH 415, which is a point-to-point bi-directional channel dedicated to one UE for the transfer of user information and a MTCH 417, which may be used for point-to-multipoint downlink transmission of traffic data.

The communication networks that accommodate some of the various examples may additionally include logical transport channels that are classified into DL and UL. The DL transport channels 420-*a* may include a broadcast channel (BCH) 422, a DL-SCH 423, a MCH 424 and a PCH 421.

The physical channels may also include a set of DL and UL channels. In some disclosed examples, the DL physical channels 430-*a* may include a PBCH 432, a PCFICH 431, a PDCCH 435, a PHICH 433, a PDSCH 434 and a PMCH 436.

UL channelization hierarchy 400-*b* may illustrate, for example, channel mapping between logical channels 410, UL transport channels 420-*b*, and UL physical channels 430-*b* for an LTE/A network. The UL transport channels 420-*b* may include a RACH 425, and an UL shared data channel (UL-SCH) 426. The UL physical channels 430-*b* may include at least one of a PRACH 437, a PUCCH 438, and a PUSCH 439.

The downlink physical channels, as discussed above, may include at least one of a PDCCH, a PHICH, and a PDSCH. The uplink physical channels may include at least one of a PUCCH and a PUSCH. The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit data or both data and control information in the PUSCH on the assigned resource blocks in the data section.

LTE/LTE-A utilizes OFDMA on the downlink and SC-FDMA on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The carriers may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. Time intervals may be expressed in multiples of a basic time unit $T_s=1/30720000$. Each frame structure may have a radio frame length $T_f=307200 \cdot T_s=10$ ms and may include two half-frames or slots of length $153600 \cdot T_s=5$ ms each. Each half-frame may include five subframes of length $30720 \cdot T_s=1$ ms.

LTE/LTE-A networks support multi-process Type II HARQ with a configurable number of independent HARQ processes. Each HARQ process waits to receive an acknowledgement (ACK) or negative acknowledgement (NAK) before transmitting a new data or transport block. LTE/LTE-A uses asynchronous HARQ transmission on the downlink and synchronous HARQ transmission on the uplink. In both asynchronous and synchronous HARQ, ACK/NAK information may be provided a certain number of subframes after a DL or UL transmission. Generally, for LTE/LTE-A FDD carriers, ACK/NAK information for a HARQ process is transmitted 4 subframes after a data transmission. In asynchronous HARQ, a schedule for subsequent transmissions is not predetermined and the eNB provides instructions to the UE regarding which HARQ process are transmitted in each subframe. For synchronous HARQ in FDD, UEs perform a second transmission of a particular HARQ process a predetermined number of subframes after receiving a NAK. Generally, for LTE/LTE-A FDD carriers, subsequent UL transmissions of the same HARQ process occur 4 subframes after receiving a NAK. For synchronous HARQ in TDD, ACK/NAK information may be received in a subframe i associated with UL transmissions in a subframe i-k, where k may be defined according to TDD UL/DL configuration. Subsequent transmissions of particular HARQ processes may be performed in a subframe n for a NAK received in a subframe n-k, where k may be defined according to TDD UL/DL configuration.

Figure 5:
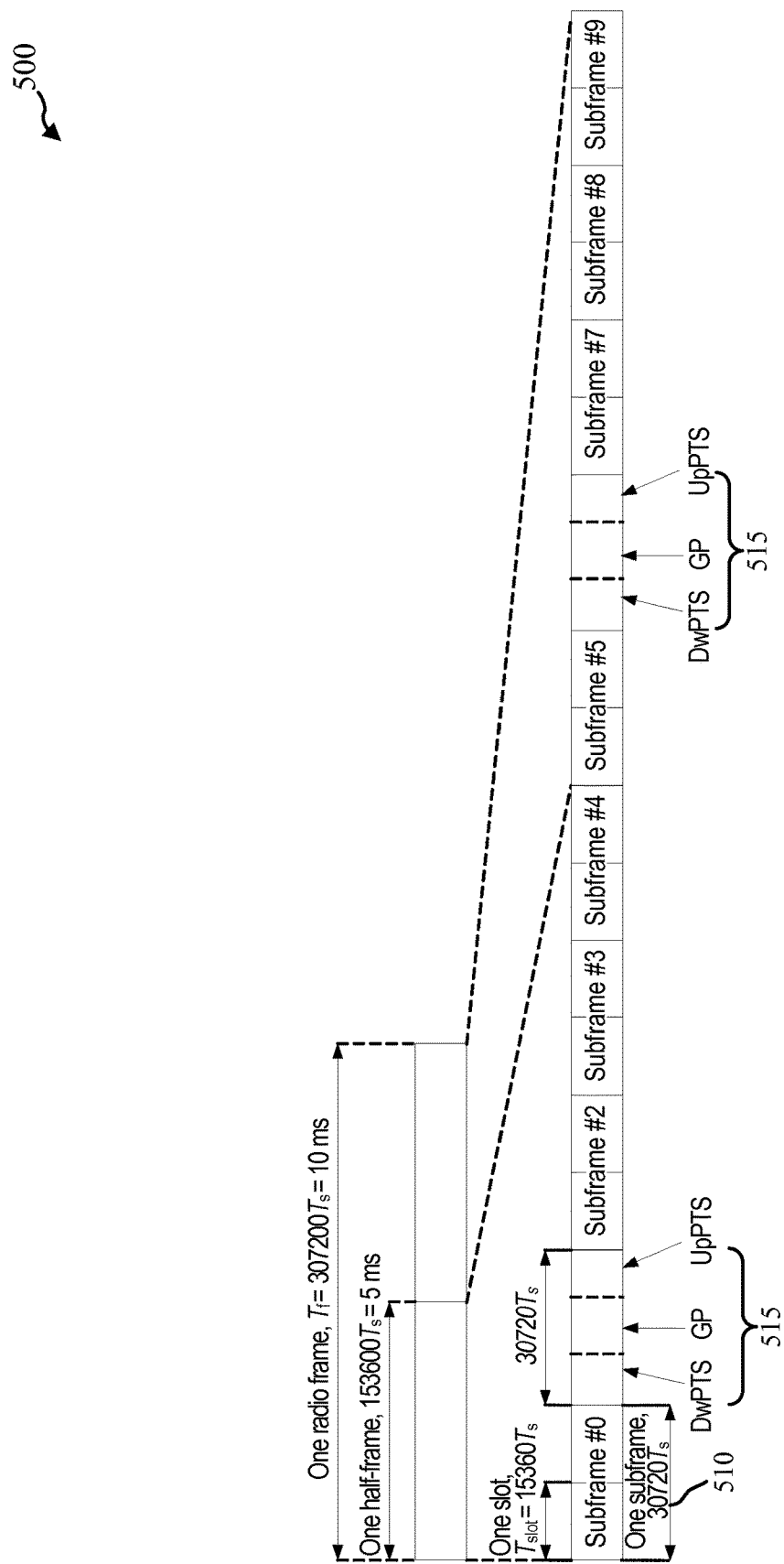
FIG. 5 shows an example of an LTE/LTE-A frame structure (e.g., a radio frame) used for communication between an evolved Node B (eNB) and a user equipment (UE), in accordance with various aspects of the present disclosure.

FIG. 5 shows an example of an LTE/LTE-A frame structure 500 (e.g., a radio frame) used for communication between an eNBs and a UE, in accordance with various aspects of the present disclosure. The frame structure may be divided into two half-frames. In some cases, a half-frame may include ten slots grouped into five subframes 510 of two slots each. In other cases, a half-frame may include 1) eight slots grouped into four subframes 510 of two slots each, and 2) three special fields grouped to form a Special (S) subframe 515. The three special fields may include a downlink pilot time slot (DwPTS), a guard period (GP), and an uplink pilot time slot (UpPTS). The S subframes may be used to switch from DL to UL traffic. However, in some cases, S subframes 515 may carry some DL and/or UL traffic. Switching from UL to DL traffic may be achieved by setting a timing advance at a UE, without the use of S subframes or a guard period between UL and DL subframes 510. Each subframe 510 may have a duration of one-millisecond (ms), and thus, the LTE/LTE-A frame structure 500 may have a duration of 10 ms.

The LTE/LTE-A frame structure 500 may be configured as a FDD frame structure or a TDD frame structure. A TDD frame structure may assume one of a number of DL/UL subframe configurations. Currently, LTE/LTE-A networks support seven DL/UL subframe configurations.

Figure 6:
FIG. 6 shows the various downlink/uplink (DL/UL) subframe configurations of the LTE/LTE-A time division duplex (TDD) frame structure described with reference to FIG. 5, in accordance with various aspects of the present disclosure.

FIG. 6 shows the seven currently-supported DL/UL subframe configurations 305 of the LTE/LTE-A TDD frame structure 500 described with reference to FIG. 5, in accordance with various aspects of the present disclosure. Each of the DL/UL subframe configurations 605 has one of two DL-to-UL switch-point periodicities 610—a five ms switch-point periodicity or a ten ms switch-point periodicity. More particularly, the DL/UL subframe configurations numbered 0, 1, 2, and 6 have a five ms switch-point periodicity (i.e., a half-frame switch-point periodicity), and the DL/UL subframe configurations numbered 3, 4, and 5 have a ten ms switch-point periodicity. The DL/UL subframe configurations having a five ms switch-point periodicity provide a number of DL subframes, a number of UL subframes, and two S subframes per radio frame. The DL/UL subframe configurations having a ten ms switch-point periodicity provide a number of DL subframes, a number of UL subframes, and one S subframe per radio frame. The allocation of DL and UL subframes within an LTE/LTE-A frame structure may be symmetric or asymmetric.

Because some TDD DL/UL subframe configurations have fewer UL subframes than DL subframes, several techniques may be used to transmit ACK/NAK information for an association set within a PUCCH transmission in an UL subframe. For example, bundling may be used to combine ACK/NAK information to reduce the amount of ACK/NAK information to be sent. ACK/NAK bundling may combine the ACK/NAK information into a single bit that is set to an ACK value if the ACK/NAK information for each subframe of the association set is an ACK. For example, ACK/NAK information may be a binary '1' to represent ACK and a binary '0' to represent a NAK for a particular subframe. ACK/NAK information may be bundled using a logical AND operation on the ACK/NAK bits of the association set. Bundling reduces the amount of information to be sent over the PUCCH and therefore increases the efficiency of HARQ ACK/NAK feedback. Multiplexing may be used to transmit multiple bits of ACK/NAK information in one uplink subframe. For example, up to four bits of ACK/NAK may be transmitted using PUCCH format 1b with channel selection.

In some examples, the wireless communication system 100 may support operation on multiple carriers, which may be referred to as carrier aggregation (CA) or multi-carrier operation. A carrier may also be referred to as a component carrier (CC), a layer, a channel, etc. The terms "carrier," "layer," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for CA. Multi-layer eNBs or base stations 105 may be configured to support communications with UEs over multiple CCs on the downlink and/or uplink. Thus, a UE 115 may receive data and control information on one or more downlink CCs from one multi-layer eNB or base stations 105 or from multiple eNBs or base stations 105 (e.g., single or multi-layer eNBs or base stations). The UE 115 may transmit data and control information on one or more uplink CCs to one or more eNBs or base stations 105. CA may be used with both FDD and TDD component carriers. For DL CA, multiple bits of ACK/NAK may be fed back when multiple DL transmissions occur in one subframe. Up to 22 bits of ACK/NAK may be transmitted using PUCCH format 3 for DL CA.

Figure 7:
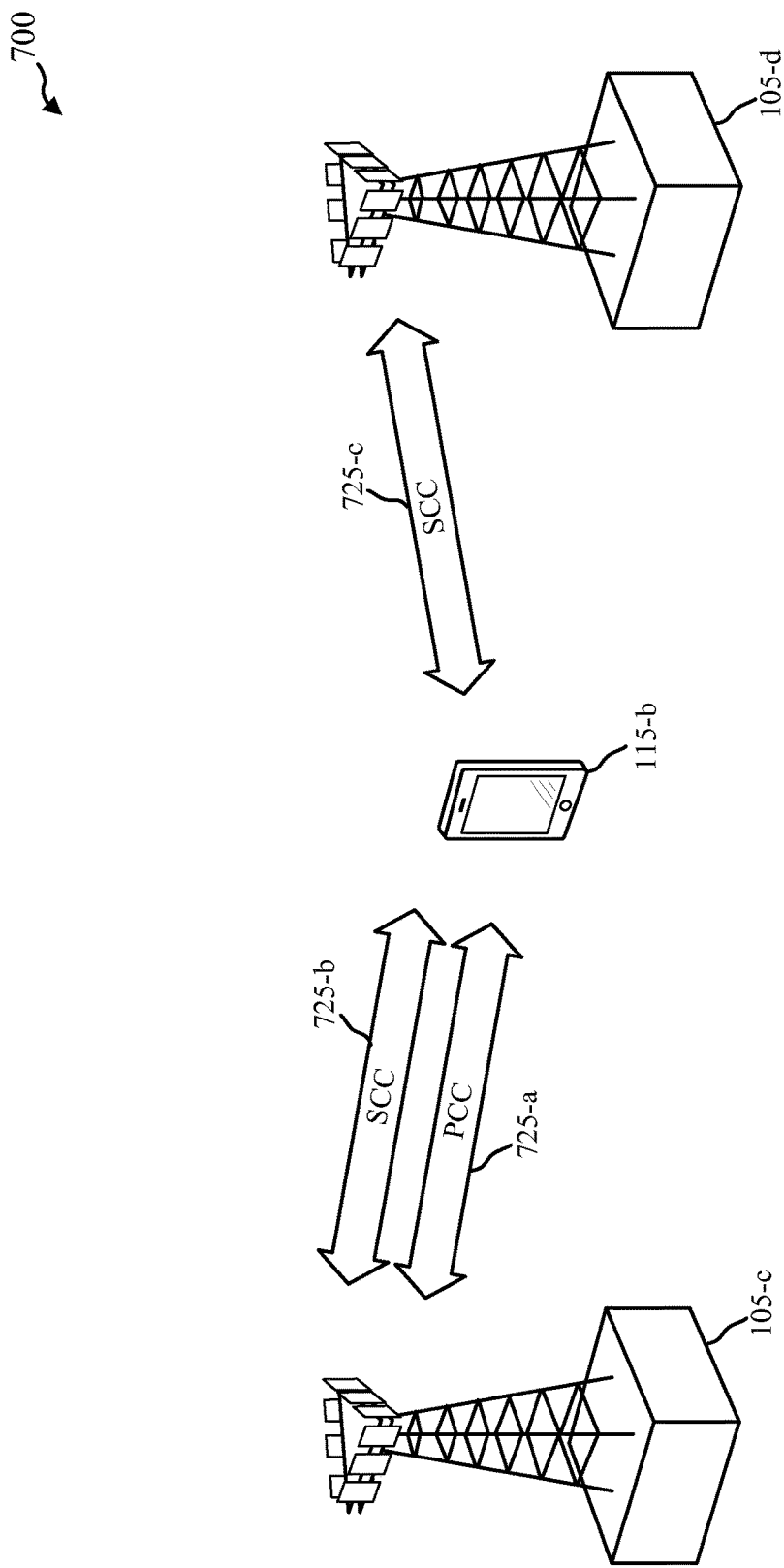
FIG. 7 shows a wireless communication system employing carrier aggregation, in accordance with various aspects of the present disclosure.

FIG. 7 shows a wireless communication system 700 employing CA, in accordance with various aspects of the present disclosure. The wireless communication system 700 may illustrate aspects of the wireless communication system 100 described with reference to FIG. 1. The wireless communication system 700 can include one or more eNBs or base stations 105 using one or more component carriers 725 to communicate with a UE 115-b. The eNBs or base stations 105 may transmit information to the UE 115-b over forward (downlink) channels on component carriers 725. In addition, the UE 115-b may transmit information to the eNBs or base stations 105 over reverse (uplink) channels on component carriers 725. In describing the various entities of FIG. 7, as well as other figures associated with some of the disclosed embodiments, for the purposes of explanation, the nomenclature associated with a 3GPP LTE or LTE-A network is used. However, it is to be appreciated that the wireless communication system 700 may operate in other networks such as, but not limited to, an OFDMA wireless network, a CDMA network, a 3GPP2 CDMA2000 network and the like. One or more of the CCs 725 may be in the same frequency operating band (intra-band) or in different frequency operating bands (inter-band) and intra-band CCs can be contiguous or non-contiguous within the operating band.

In the wireless communication system 700, UE 115-b may be configured with multiple CCs associated with one or more eNBs or base stations 105. At least one CC may be designated as the primary CC (PCC) 725-a for the UE 115-b and at least one CC may be designated as the secondary CC (SCC) 725-b, 725-c. PCCs may be semi-statically configured by higher layers (e.g., RRC, etc.) on a per-UE basis. Certain uplink control information (UCI) (e.g., ACK/NAK, channel quality information (CQI), scheduling requests (SR), etc.), when transmitted on PUCCH, are carried by the PCC 725-a. The UE 115-b may be configured with asymmetric DL-to-UL CC assignments. In LTE/LTE-A, up to 5:1 DL-to-UL mapping is supported. Thus, one UL CC (e.g., PCC UL) may carry UCI (e.g., ACK/NAK) on PUCCH for up to 5 DL CCs.

In the example illustrated in FIG. 7, UE 115-b is configured with a PCC 725-a and an SCC 725-b associated with eNB or base station 105-c and an SCC 725-c associated with eNB or base station 105-d. The wireless communication system 700 may be configured to support CA using various combinations of FDD and/or TDD CCs 725. For example, some configurations of the wireless communication system 700 may support CA for FDD CCs (e.g., an FDD PCC and one or more FDD SCCs). Other configurations may support CA using TDD CCs (e.g., a TDD PCC and one or more TDD SCCs). In some examples, the TDD SCCs for CA have the same DL/UL subframe configuration while other examples support TDD CA with CCs of different DL/UL subframe configurations.

In some wireless communication systems, TDD DL/UL subframe configurations may be dynamically adapted based on the actual traffic needs of the carriers. Such adaptation is known as evolved interference management for traffic adaptation (eIMTA). For example, if, during a short duration, a large data burst on a downlink is needed, a TDD DL/UL subframe configuration can be changed from, for example, configuration 1 (which includes six downlink subframes) to configuration 5 (which includes nine downlink subframes) (see, e.g., FIG. 6). The dynamic adaptation of TDD DL/UL subframe configurations is expected to occur no slower than 640 ms, and it could occur as fast as 10 ms. This adaptation, however, can result in interference in both downlink and uplink carriers when two or more carriers are using different DL/UL subframe configurations. The adaptation may also lead to complexity in DL and UL HARQ timing management. For example, each of the DL/UL subframe configurations has its own DL/UL HARQ timing, meaning that the timing from a PDSCH to the corresponding ACK/NAK can be different for different TDD DL/UL subframe configurations. The DL/UL HARQ timing may be optimized for each DL/UL subframe configuration (in terms of HARQ operation efficiency). Thus, dynamic switching among the different DL/UL subframe configurations implies that if a current DL/UL HARQ timing is kept, there is a potential that interference could occur and some ACK/NAK transmission opportunities could be missed.

Recognizing this potential for interference, steps may be taken to address this issue. For example, during dynamic indication of TDD DL/UL subframe configurations, an indication of an updated TDD DL/UL subframe configuration may be made using, for example a DCI transmitted in at least a primary serving cell's PDCCH. The reconfiguration DCI includes at least three bits to explicitly indicate the updated DL/UL subframe configuration. Once an updated DL/UL subframe configuration is indicated, a UE configured with TDD eIMTA, may implement a HARQ uplink operation by using the HARQ timing that corresponds to a DL/UL subframe configuration signaled in SIB1. A HARQ downlink operation may be selected, for example, from a reference configuration selected from one of TDD DL/UL subframe configurations 2, 4, and 5 (see, e.g., FIG. 6).

In eIMTA, some subframes may not be subject to dynamic adaptations of transmission direction, while other subframes may be subject to dynamic adaptation of transmission direction. For example, DL subframes in the TDD DL/UL subframe configuration signaled in SIB1 may not be subject to dynamic adaptation, while UL subframes in the reference configuration used for a HARQ downlink operation may not be subject to dynamic adaptation.

Some wireless communication systems may support the transmission of periodic and/or aperiodic CSI from a UE to an eNB or base station. In the case of a UE involved in CA and/or CoMP operation, a UE may need to manage two or more CSI processes (e.g., two or more processes for acquiring channel measurements and generating one or more CSI reports for return to an eNB or base station). For a UE involved in a CA operation, a plurality of CSI processes may be separately managed for each CC involved in the CA operation. In some cases, there could be up to five CSI processes associated with five CCs. For a UE involved in a CoMP operation, two or more CSI processes may be associated with two or more transmission points on a common CC. In some cases, there may be up to four CSI processes associated with four transmission points on a common CC.

In some LTE/LTE-A releases, each CSI process under a DL transmission mode may be associated with a non-zero-power (NZP) CSI reference signal (CSI-RS) and CSI interference measurement (CSI-IM; also known as an interference measurement resource (IMR)). Each CSI process may be separately configured using a reporting restriction parameter (e.g., a codebookSubsetRestriction parameter) to restrict a set of codebooks and/or ranks that a UE can support. Each CSI process may also be separately configured with a $P_c$ parameter. The $P_c$ parameter is an energy per resource element (EPRE) ratio which may, in some examples, be a ratio of a reference signal EPRE to a pilot signal EPRE (e.g., a ratio of PDSCH EPRE to CSI-RS EPRE). The parameter $P_c$ may enable a UE to derive CSI feedback to more flexibly manage DL transmission power. The $P_c$ parameter may be in the range of [−8, 15] dB with a 1 dB step size, for example.

In the case of enhanced intercell interference cancelation (eICIC) operation, a UE may be configured with two subframe measurement sets that do not overlap (e.g., two subframe measurement sets that are mutually orthogonal, such that the two subframe measurement sets do not share a common subframe). The codebookSubsetRestriction parameter may be separately indicated for each of the two subframe measurement sets.

In some systems, the minimum UE capability for LTE/LTE-A CSI process management under TDD eIMTA operation may be one CSI process. Moreover, a UE managing one CSI process under TDD eIMTA operation may be able to support up to two CSI-IMs (i.e., up to two IMRs) for one CSI process. For aperiodic CSI reporting in transmission mode 10 for a single serving cell, when a UE is configured to manage one CSI process, CSI may be reported for one subframe measurement set in any subframe. The embodiments described herein provide frameworks for configuring and/or managing two IMRs for a CSI process.

Figure 8:
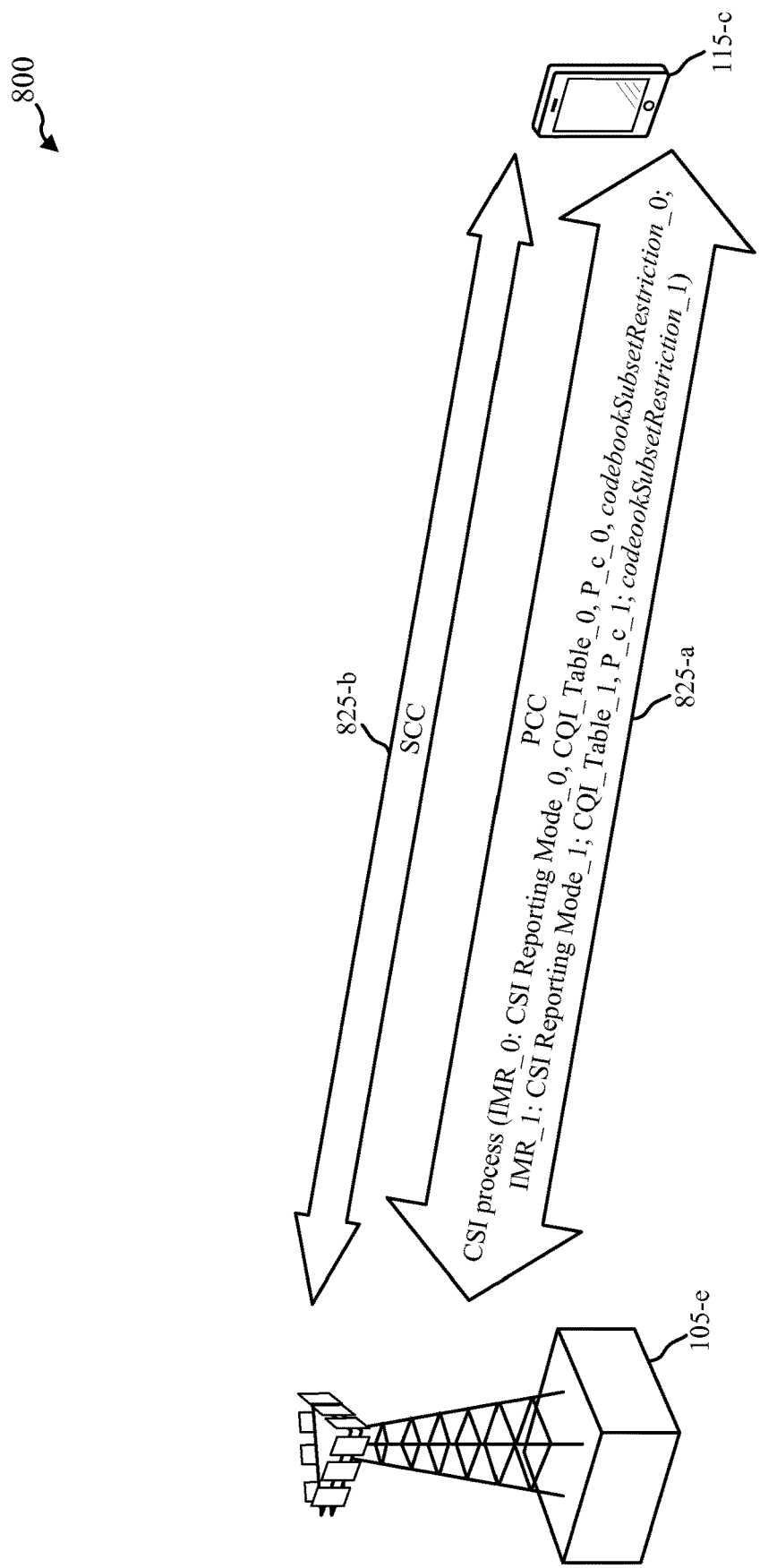
FIG. 8 shows a wireless communication system employing carrier aggregation, in accordance with various aspects of the present disclosure.

FIG. 8 shows a wireless communication system 800 employing CA, in accordance with various aspects of the present disclosure. The wireless communication system 800 may illustrate aspects of the wireless communication system 100 and/or 700 described with reference to FIGS. 1 and/or 7. The wireless communication system 800 may include one or more eNBs or base stations 105 using one or more CCs 825 to communicate with a UE 115-c. The eNBs or base stations 105 may transmit information to the UE 115-c over forward (downlink) channels on the CCs 825. In addition, the UE 115-c may transmit information to the eNBs or base stations 105 over reverse (uplink) channels on the CCs 825.

In the wireless communication system 800, UE 115-c is configured with multiple CCs associated with an eNB or base station 105-e. One CC is designated as the PCC 825-a for the UE 115-c. An additional one or more CCs are designated as SCCs 825-b for the UE 115-c. The wireless communication system 800 may be configured to support CA using various combinations of FDD and/or TDD CCs 825. For example, some configurations of the wireless communication system 800 may support CA for FDD CCs (e.g., an FDD PCC and one or more FDD SCCs). Other configurations may support CA using TDD CCs (e.g., a TDD PCC and one or more TDD SCCs). In some examples, the TDD SCCs for CA have the same DL/UL subframe configuration while other examples support TDD CA with CCs of different DL/UL subframe configurations.

The PCC 825-a for the UE 115-c is shown to carry a CSI process. By way of example, the CSI process may be associated with an allocation of two IMRs (e.g., IMR_0 and IMR_1). The first IMR (e.g., IMR_0) may be associated with a plurality of management configurations, including a CSI reporting mode (e.g., CSI_Reporting_Mode_0), a channel quality indication (CQI) table (e.g., CQI_Table_0), an EPRE ratio (e.g., $P_{c0}$), and a reporting restriction parameter (e.g., codebookSubsetRestriction_0). Similarly, the second IMR (e.g., IMR_1) may be associated with a plurality of management configurations, including a CSI reporting mode (e.g., CSI_Reporting_Mode_1), a CQI table (e.g., CQI_Table_1), an EPRE ratio (e.g., $P_{c1}$), and a reporting restriction parameter (e.g., codebookSubsetRestriction_1). The CQI table may include at least one of a legacy CQI table (e.g., a CQI table supported by an older communication technology or older version of a communication technology) and a new CQI table (e.g., a CQI table supported by a newer communication technology or newer version of a communication technology) which may support higher spectral efficiencies than the legacy CQI table. In one example, the new CQI table may support 256-QAM (quadrature amplitude modulation), while the legacy CQI table may not support 256-QAM. In some cases, the plurality of management configurations for the first IMR and the second IMR may be separately (e.g., independently) indicated (e.g., separately (or independently) configured, separately (or independently) managed). As one example, all of the management configurations for the first IMR (e.g., CSI_Reporting_Mode_0, CQI_Table_0, $P_{c0}$), and codebookSubsetRestriction_0) may be separately managed from those of the second IMR. In other cases, at least one of the plurality of management configurations may be separately indicated for the first IMR and the second IMR, and at least one of the plurality of management configurations may be jointly indicated for the first IMR and the second IMR. In other cases, all of the plurality of management configurations may be jointly indicated for the first IMR and the second IMR.

By way of example, CSI_Reporting_Mode_0 and CQI_Table_0 may be separately indicated for the first IMR from those of the second IMR, while $P_{c0}$, and codebookSubsetRestriction_0 may be jointly indicated for the first IMR and the second IMR. In another example, CSI_Reporting_Mode_0 may be separately indicated for the first IMR from that of the second IMR, while CQI_Table_0, $P_{c0}$, and codebookSubsetRestriction_0 for the first IMR may be jointly indicated for the first IMR and the second IMR. In yet another example, CQI_Table_0 may be separately indicated for the first IMR while CSI_Reporting_Mode_0, $P_{c0}$, and codebookSubsetRestriction_0 may be jointly indicated for the first IMR and the second IMR. In yet another example, all of the configurations, CSI_Reporting_Mode_0, CQI_Table_0, $P_{c0}$, and codebookSubsetRestriction_0 may be jointly indicated for the first IMR and the second IMR.

These various methods for indicating the management configurations of IMRs are described in more detail with reference to FIGS. 9, 10, 11, 14, 15, 16, 17, 18, and 19. Although FIG. 8 illustrates an example in which a UE 115-*c* is employed in a CA scenario, the methods for indicating the management configurations of IMRs may alternatively be employed in the absence of CA, in a dual-connectivity scenario, in a scenario in which a UE is configured with a single CC, etc.

In some examples, the two IMRs may each be associated with one or more subframe sets associated with the CSI process. In some cases, the one or more subframe sets may be referred to as a csi-SubframeSet. The csi-SubframeSet may indicate whether a CSI measurement or CSI reporting may be subframe set-dependent, and/or indicate a configuration of an additional IMR for the CSI process. Additionally or alternatively, the plurality of management configurations may be associated with a DL transmission mode configured for the UE. For example, when a UE is configured for a transmission mode 10, the management configurations may be separately indicated for the first IMR and the second IMR, and when the UE is configured for other DL transmission modes such as a transmission mode 1 to 9, some (or, alternatively, all) of the plurality management configurations may be jointly indicated for the first IMR and the second IMR and other (or, alternatively, none of the) configurations may be separately indicated for the first IMR and the second IMR.

By way of example, when the UE is configured for a transmission mode 10, a CSI reporting mode, a $P_c$, and a codebookSubsetRestriction may be configured (e.g., separately configured) for each subframe set (e.g., subframe set-dependent) associated with the CSI process. When the UE is configured for transmission mode 1 or 9, a $P_c$ and a codebookSubsetRestriction may be configured the same (e.g., jointly configured) for each subframe set associated with the CSI process while a CSI reporting mode may be configured separately (e.g., differently) for each subframe set associated with the CSI process.

In cases in which a UE is configured for a transmission mode 10, the UE may be configured with a rank indicator (RI)-reference CSI process for the CSI process. In such cases, the reported RI for the CSI process may be the same as the RI-reference CSI process. When the UE is configured with an RI-reference CSI process for the CSI process and the subframe sets are configured by a higher layer for one CSI process, the management configurations may be the same for the subframe sets. For example, the UE may not be expected to receive a configuration for the CSI process configured with subframe sets that have a different set of restricted RIs with a precoder codebook subset restriction between the subframe sets. Also or alternatively, the UE may not be expected to receive configurations for the CSI process and the RI-reference CSI process that have a different CSI reporting mode, a number of CSI-RS antenna ports, and/or a set of restricted RIs with a precoder codebook subset restriction.

In some cases, a CQI reporting mode may be configured for each of the subframe sets associated with the CSI process. For example, a first aperiodic CQI reporting may be configured for a first subframe set when two subframe measurement sets are configured for the same frequency as the CSI process. A second aperiodic CSI reporting for a second subframe set may be configured if the two subframe measurement sets are configured for the same frequency as the CSI process.

In some cases, it may be useful to have some correlation between CSI reporting based on different IMRs for a CSI process. The use of inheritance to enforce a common CSI feedback value across different IMRs for a CSI process may provide a more dynamic method of enforcing a common CSI feedback value (e.g., a more dynamic enforcement method than semi-statically enforcing a common CSI feedback value via a jointly indicated codebookSubsetRestriction).

When using inheritance to enforce a common rank across different IMRs for a CSI process, deriving a joint RI for the reference and any dependent IMRs of the CSI process may be unnecessary. For example, the RI may be based on the RI of the reference IMR, and not on any other IMRs of the CSI process. Performing a joint CSI computation across the reference IMR and dependent IMR(s) of the CSI process may be unnecessary.

When a codebookSubsetRestriction parameter is separately indicated for the individual IMRs of a CSI process, it may be useful for the codebookSubsetRestriction parameters of the IMRs to be compatible when the IMRs are involved in IMR inheritance. For example, the codebookSubsetRestriction parameter indicated for the IMRs may contain the same set of RIs, but may or may not contain different sets of precoding vectors. Methods and apparatus in which one or more CSI feedback values may be inherited by an IMR from a reference IMR are described in more detail with reference to FIGS. 7, 8, 13, and 16.

Figure 9:
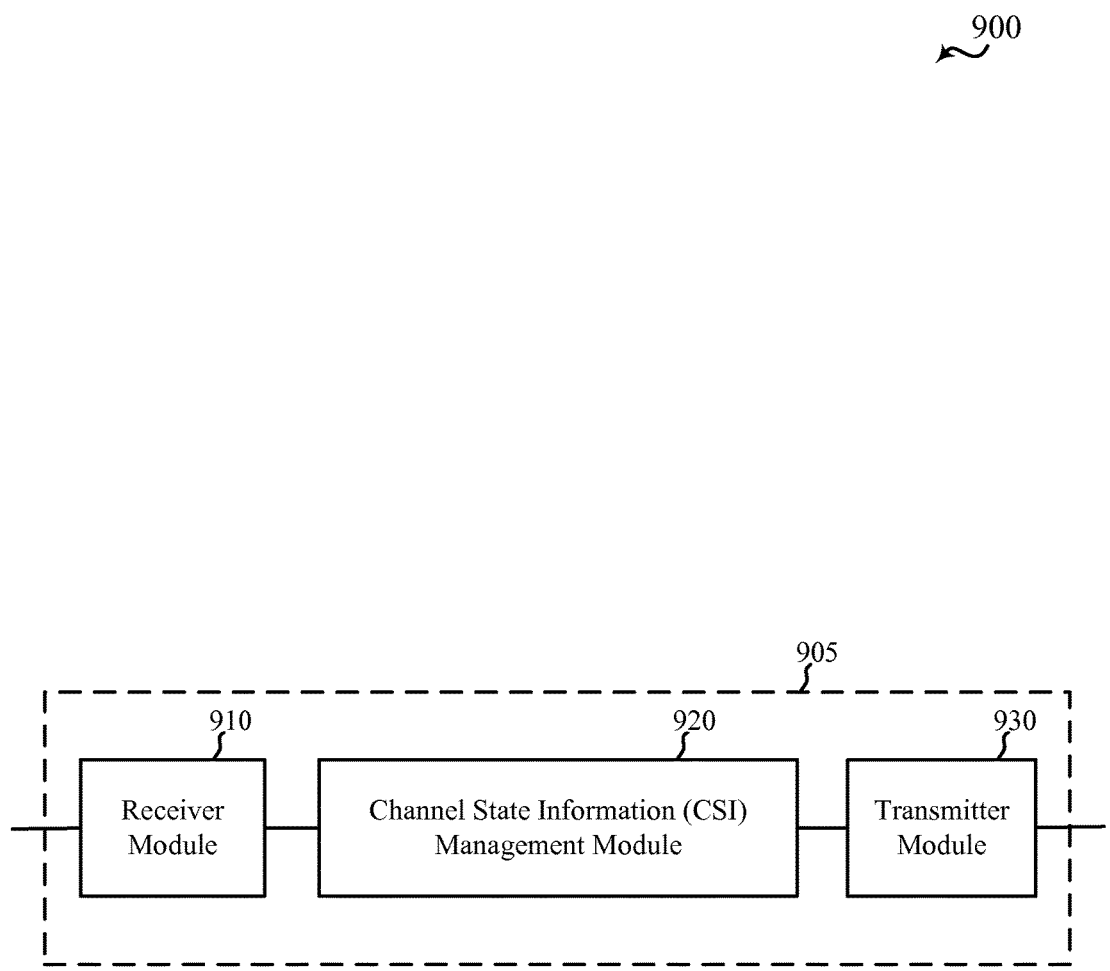
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be configured as a UE and be an example of aspects of one or more of the UEs 115 described with reference to FIGS. 1, 2, 7, and/or 8. In other examples, the apparatus 905 may be configured as a base station (or as an eNB including a base station) and be an example of aspects of one or more of the eNBs or base stations 105 described with reference to FIGS. 1, 2, 7, and/or 8. The apparatus 905 may also be a processor. The apparatus 905 may include a receiver module 910, a CSI management module 920, and/or a transmitter module 930. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a radio frequency spectrum. In some examples, the radio frequency spectrum may be used for LTE/LTE-A communications, as described, for example, with reference to FIGS. 1, 7, and/or 8. The receiver module 910 may be used to receive various types of data and/or control signals (i.e., transmissions) over one or more communication links of a wireless communication system, such as one or more communication links 125 and/or component carriers 725 and/or 825 of the wireless communication system 100, 700, and/or 800 described with reference to FIGS. 1, 7, and/or 8, respectively. Examples of the types of data and/or control signals received by the receiver module 910 include the granting of resources via either PDSCH and PUSCH.

In some examples, the transmitter module 930 may include at least one RF transmitter, such as at least one RF transmitter operable to transmit discovery messages. The transmitter module 930 may be used to transmit various types of data and/or control signals (i.e., transmissions) over one or more communication links of a wireless communication system, such as one or more communication links 125 and/or CCs 725 and/or 825 of the wireless communication system 100, 700, and/or 800 described with reference to FIGS. 1, 7, and/or 8, respectively. Examples of the types of data and/or control signals transmitted by the transmitter module 930 include HARQ feedback, CSI reporting, and/or UCI reporting.

When the apparatus 905 is configured as a UE, and in some examples, the CSI management module 920 may be used to receive (e.g., via the receiver module 910) an allocation of two or more IMRs for a CSI process. The CSI management module 920 may also receive (e.g., via the receiver module 910) a plurality of management configurations for use of the two or more IMRs. At least one of the plurality of management configurations may be separately indicated (e.g., separately configured, separately managed) for the two or more IMRs. In some examples, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter. The CSI management module 920 may use the two or more IMRs in accordance with the plurality of management configurations to perform channel measurement and/or CSI reporting. Channel measurement may be carried out on signals received via the receiver module 910, while CSI reports may be transmitted via the transmitter module 930.

In some examples of the apparatus 905 configured as a UE, at least two of the two or more IMRs for the CSI process may be configured in overlapped subframes. In some examples of the apparatus 905 configured as a UE, the CSI management module 920 may receive a downlink control channel to trigger the CSI reporting. In some examples of the apparatus 905 configured as a UE, the CSI management module 920 may be used to receive a plurality of CSI processes. Some or all of the CSI processes may be associated with an allocation of two or more IMRs. However, in some embodiments, some of the CSI processes may be associated with an allocation of one IMR.

When the apparatus 905 is configured as a base station or eNB, and in some examples, the CSI management module 920 may be used to transmit (e.g., via the transmitter module 930) an allocation of two or more IMRs for a CSI process. The CSI management module 920 may also transmit (e.g., via the transmitter module 930) a plurality of management configurations for use of the two or more IMRs. At least one of the plurality of management configurations may be separately indicated for the two or more IMRs. In some examples, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter. The CSI management module 920 may receive at least one CSI report based on at least one of the two or more IMRs. The at least one CSI report may be received via the receiver module 910.

In some examples of the apparatus 905 configured as a base station or eNB, at least two of the two or more IMRs for the CSI process may be configured in overlapped subframes. In some examples of the apparatus 905 configured as a base station or eNB, the CSI management module 920 may transmit a downlink control channel to trigger UE transmission of the at least one CSI report. In some examples of the apparatus 905 configured as a base station or eNB, the CSI management module 920 may be used to transmit a plurality of CSI processes. Some or all of the CSI processes may be associated with an allocation of two or more IMRs. However, in some embodiments, some of the CSI processes may be associated with an allocation of one IMR.

In some examples, the apparatus 905 may be configured to use eIMTA and/or network assisted interference cancellation and suppression (NAICS) operations (or other frameworks in which two or more IMRs may be allocated to a single CSI process).

Figure 10:
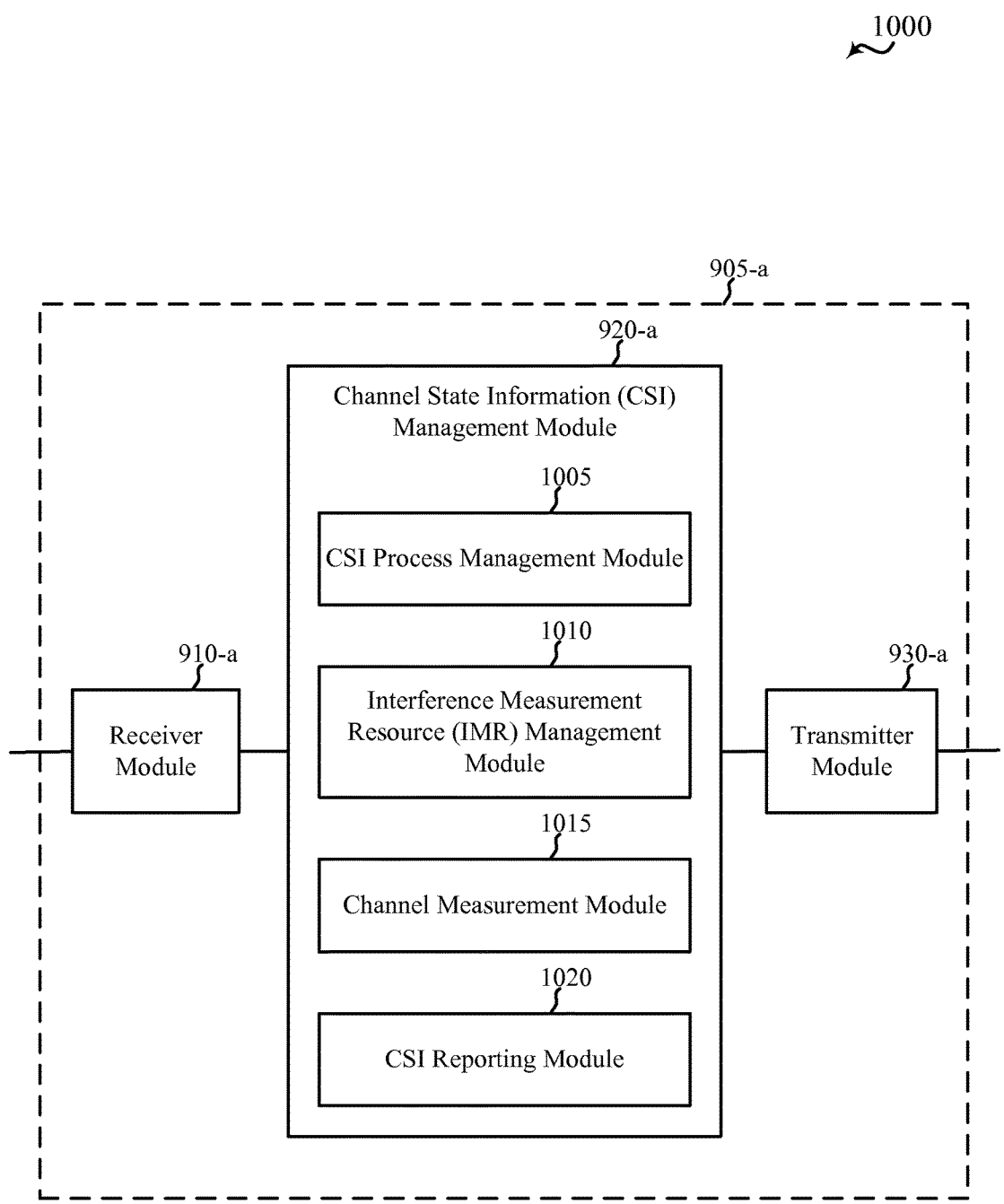
FIG. 10 shows a block diagram of an apparatus for use in wireless communication, in accordance with various aspects of the present disclosure.

FIG. 10 shows a block diagram 1000 of an apparatus 905-*a* for wireless communication, which apparatus 905-*a* may be an example of aspects of the apparatus 905 (of FIG. 9) when configured as a UE, in accordance with various aspects of the present disclosure. In some examples, the apparatus 905-*a* may include a receiver module 910-*a* and a transmitter module 930-*a* that are examples of the receiver module 910 and the transmitter module 930 described with reference to FIG. 9. In additional examples, the apparatus 905-*a* may include a CSI management module 920-*a*, which may be an example of one or more aspects of the CSI management module 920 described with reference to FIG. 9. In some examples, the CSI management module 920-*a* may include a CSI process management module 1005, an IMR management module 1010, a channel measurement module 1015, and/or a CSI reporting module 1020. While FIG. 10 illustrates separate modules 1005, 1010, 1015, and 1020, the functions performed by each of the modules 1005, 1010, 1015, and 1020 may in some cases be combined, divided, or implemented using one or more other modules.

In some examples, the CSI process management module 1005 may be used to receive (e.g., via the receiver module 910-*a*) an allocation of two or more IMRs for a CSI process. In some examples, the IMR management module 1010 may be used to receive (e.g., via the receiver module 910-*a*) a plurality of management configurations for use of the two or more IMRs. In some examples, all of the plurality of management configurations may be separately indicated (e.g., separately configured, separately managed) for the two or more IMRs. In some examples, at least one of the plurality of management configurations may be separately indicated for each of the two or more IMRs, and at least one of the plurality of management configurations may be jointly indicated for each of the two or more IMRs. In some examples, all of the plurality of management configurations may be jointly indicated for the two or more IMRs.

In some examples, the plurality of management configurations received by the IMR management module 1010 may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter.

In some examples of the operation(s) performed by the IMR management module 1010, the plurality of management configurations received by the IMR management module 1010 may include 1) a CSI reporting mode, a CQI table, and a reporting restriction parameter that are separately indicated for the two or more IMRs, and 2) an EPRE ratio that is jointly indicated for the two or more IMRs. In other examples, the plurality of management configurations received by the IMR management module 1010 may include 1) a CSI reporting mode that is separately indicated for the two or more IMRs, and 2) a CQI table, an EPRE ratio, and a reporting restriction parameter that are jointly indicated for the two or more IMRs.

In some examples, the IMR management module 1010 may receive an indication that one of the two or more IMRs is a reference IMR. In these examples, and in some cases, at least one of the two or more IMRs may inherit at least one CSI feedback value from the reference IMR. In some examples, the at least one CSI feedback value inherited from the reference IMR may include a rank (e.g., an RI) and/or a CSI reporting mode. In some examples, a reference IMR may be employed when two or more IMRs for a CSI process are indicated to have the same CSI reporting mode.

In some examples, the channel measurement module 1015 may use the two or more IMRs in accordance with the plurality of management configurations to perform channel measurement. Channel measurement may be carried out on signals received via the receiver module 910-*a*.

In some examples, the CSI reporting module 1020 may use the two or more IMRs in accordance with the plurality of management configurations to perform CSI reporting. CSI reports may be transmitted via the transmitter module 930-*a*.

In some examples of the apparatus 905-*a*, at least two of the two or more IMRs for the CSI process may be configured in overlapped subframes. In some examples of the apparatus 905-*a*, the CSI management module 920-*a* may receive a downlink control channel to trigger the CSI reporting.

In some examples of the apparatus 905-*a*, the CSI management module 920-*a* may be used to receive a plurality of CSI processes. Some or all of the CSI processes may be associated with an allocation of two or more IMRs. However, in some embodiments, some of the CSI processes may be associated with an allocation of one IMR. For the CSI processes associated with an allocation of two or more IMRs, the plurality of management configurations received for the two or more IMRs associated with a single CSI process may include separately indicated management configurations and/or jointly indicated management configurations.

In some examples, the apparatus 905-*a* may be configured to use eIMTA and/or NAICS operations (or other frameworks in which two or more IMRs may be allocated to a single CSI process).

Figure 11:
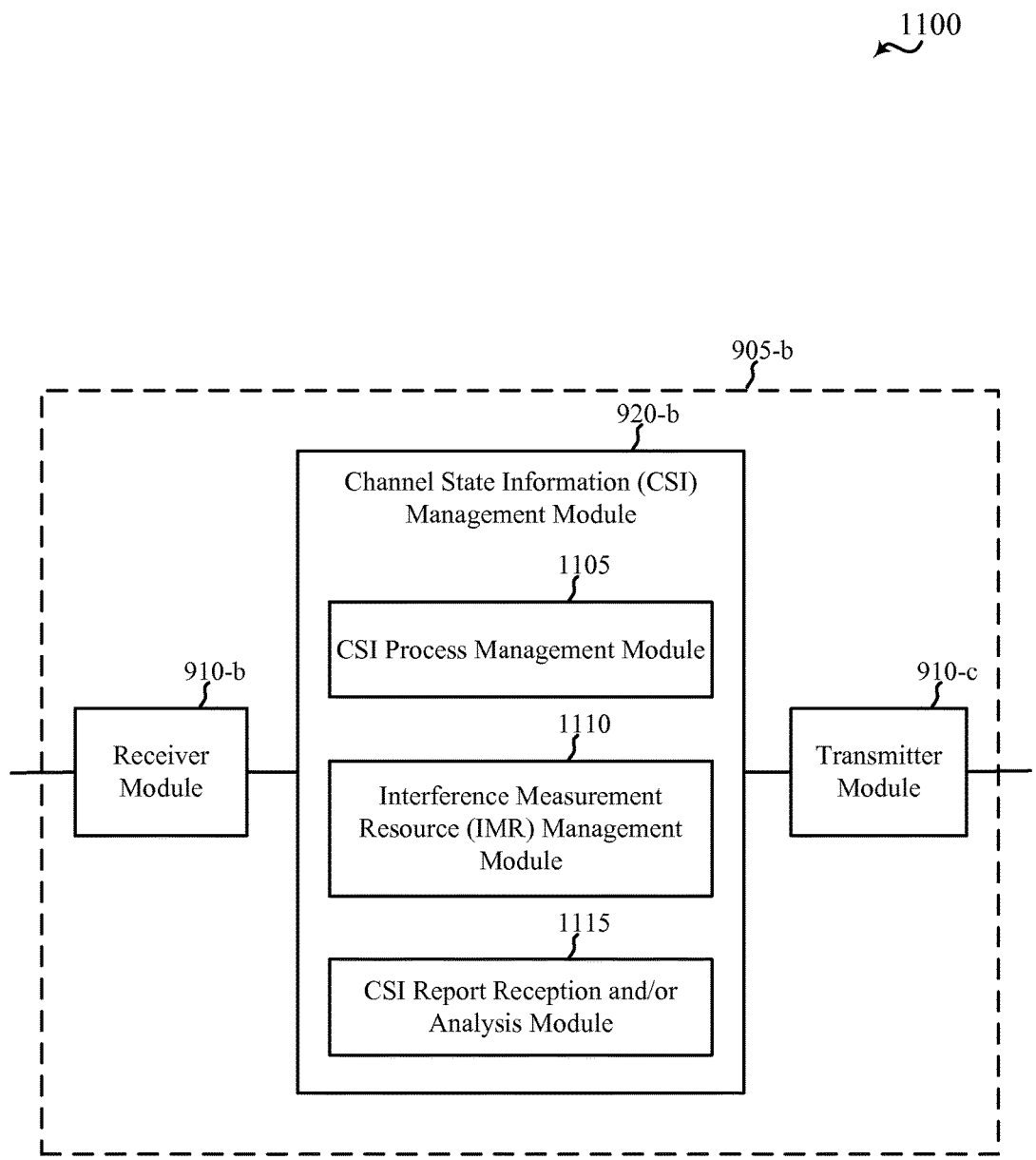
FIG. 11 shows a block diagram of an apparatus for use in wireless communication, in accordance with various aspects of the present disclosure.

FIG. 11 shows a block diagram 1100 of an apparatus 905-*b* for wireless communication, which apparatus 905-*b* may be an example of aspects of the apparatus 905 (of FIG. 9) when configured as a base station or eNB, in accordance with various aspects of the present disclosure. In some examples, the apparatus 905-*b* may include a receiver module 910-*b* and a transmitter module 930-*b* that are examples of the receiver module 910 and the transmitter module 930 described with reference to FIG. 9. In additional examples, the apparatus 905-*b* may include a CSI management module 920-*b*, which may be an example of aspects of one or more of the CSI management module 920 described with reference to FIG. 9. In some examples, the CSI management module 920-*b* may include a CSI process management module 1105, an IMR management module 1110, and/or a CSI report reception and/or analysis module 1115. While FIG. 11 illustrates specific examples of the functions performed by each of the modules 1105, 1110, and 1115, the functions performed by each of the modules 1105, 1110, and 1115 may in some cases be combined, divided, or implemented using one or more other modules.

In some examples, the CSI process management module 1105 may be used to transmit (e.g., via the transmitter module 930-*b*) an allocation of two or more IMRs for a CSI process.

In some examples, the IMR management module 1110 may be used to transmit (e.g., via the transmitter module 930-*b*) a plurality of management configurations for use of the two or more IMRs. In some examples, all of the plurality of management configurations may be separately indicated for the two or more IMRs. In some examples, at least one of the plurality of management configurations may be separately indicated (e.g., separately configured, separately managed) for the two or more IMRs, and at least one of the plurality of management configurations may be jointly indicated for the two or more IMRs. In some examples, all of the plurality of management configurations may be jointly indicated for the two or more IMRs.

In some examples, the plurality of management configurations transmitted by the IMR management module 1110 may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter.

In some examples of the operation(s) performed by the IMR management module 1110, the plurality of management configurations transmitted by the IMR management module 1110 may include 1) a CSI reporting mode, a CQI table, and a reporting restriction parameter that are separately indicated for the two or more IMRs, and 2) an EPRE ratio that is jointly indicated for the two or more IMRs. In other examples, the plurality of management configurations transmitted by the IMR management module 1110 may include 1) a CSI reporting mode that is separately indicated for the two or more IMRs, and 2) a CQI table, an EPRE ratio and a reporting restriction parameter that are jointly indicated for the two or more IMRs.

In some examples, the IMR management module 1110 may transmit an indication that one of the two or more IMRs is a reference IMR. In these examples, and in some cases, at least one of the two or more IMRs may inherit at least one CSI feedback value from the reference IMR. In some examples, the at least one CSI feedback value inherited from the reference IMR may include a rank (e.g., an RI) and/or a CSI reporting mode. In some examples, a reference IMR may be employed when two or more IMRs for a CSI process are indicated to have the same CSI reporting mode.

In some examples, the CSI report reception and/or analysis module 1115 may receive at least one CSI report based on at least one of the two or more IMRs. CSI reports may be received via the receiver module 910-*b*.

In some examples of the apparatus 905-*b*, at least two of the two or more IMRs for the CSI process may be configured in overlapped subframes. In some examples of the apparatus 905-*b*, the CSI management module 920-*b* may transmit a downlink control channel to trigger UE transmission of the at least one CSI report.

In some examples of the apparatus 905-*b*, the CSI management module 920-*b* may be used to transmit a plurality of CSI processes. Some or all of the CSI processes may be associated with an allocation of two or more IMRs. However, in some embodiments, some of the CSI processes may be associated with an allocation of one IMR. For the CSI processes associated with an allocation of two or more IMRs, the plurality of management configurations transmitted for the two or more IMRs associated with a single CSI process may include separately indicated management configurations and/or jointly indicated management configurations.

In some examples, the apparatus 905-*b* may be configured to use eIMTA and/or NAICS operations (or other frameworks in which two or more IMRs may be allocated to a single CSI process).

Figure 12:
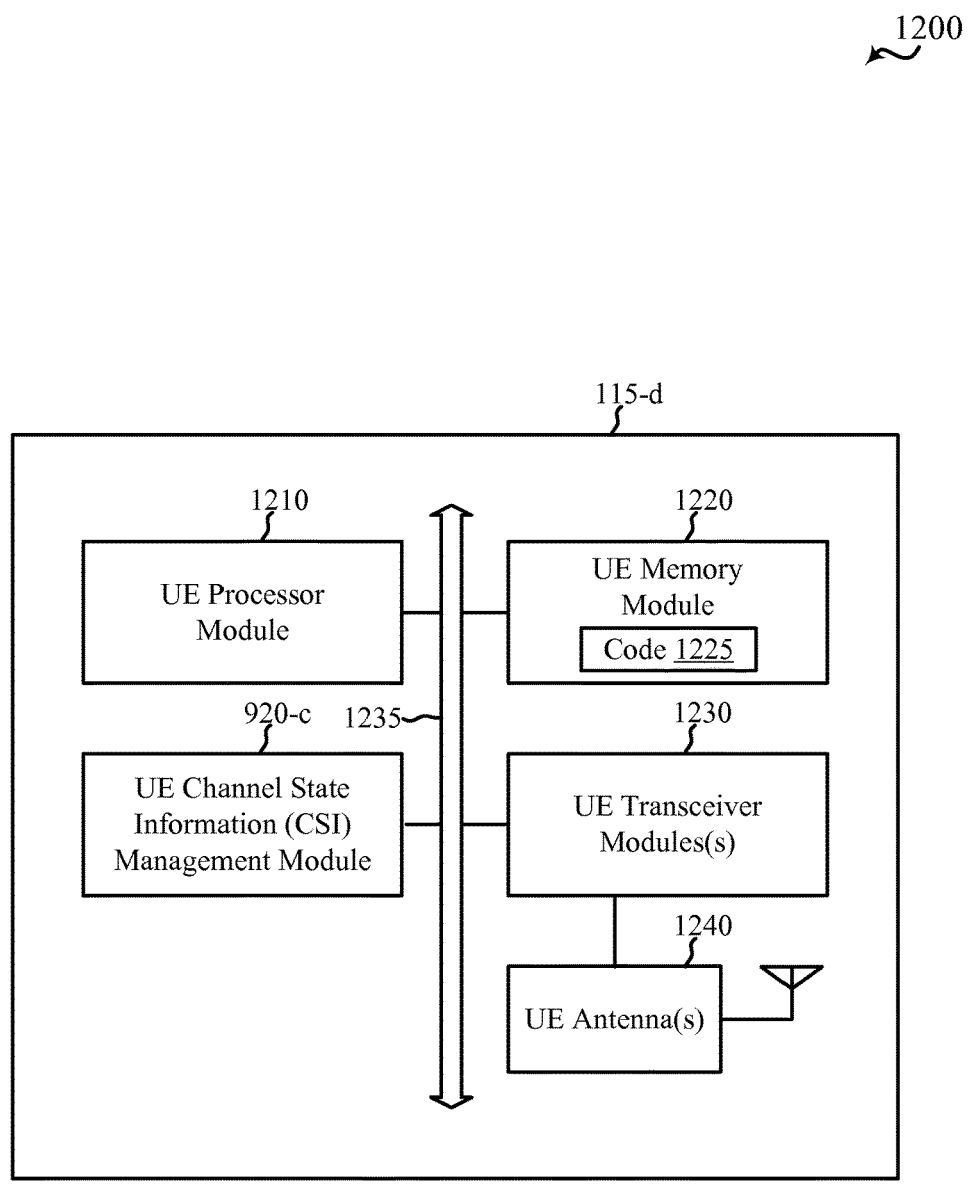
FIG. 12 shows a block diagram of a UE for use in wireless communication, in accordance with various aspects of the present disclosure.

FIG. 12 shows a block diagram 1200 of a UE 115-*d* for use in wireless communication, in accordance with various aspects of the present disclosure. The UE 115-*d* may have various configurations and may be or be part of a personal computer (e.g., a laptop computer, a netbook computer, a tablet computer, etc.), a cellular telephone, a smart phone, a PDA, a digital video recorder (DVR), an internet appliance, a gaming console, an e-reader, etc. The UE 115-*d* may, in some examples, have an internal power supply (not shown), such as a small battery, to facilitate mobile operation. In some examples, the UE 115-*d* may be an example of aspects of one or more of the UEs 115 described with reference to FIGS. 1, 7, and/or 8, and/or aspects of one or more of the apparatuses 905 described with reference to FIGS. 9 and/or 10. The UE 115-*d* may be configured to implement at least some of the UE and/or apparatus features and functions described with reference to FIGS. 1, 5, 6, 7, 8, 9, and/or 10.

The UE 115-*d* may include a UE processor module 1210, a UE memory module 1220, at least one UE transceiver module (represented by UE transceiver module(s) 1230), at least one UE antenna (represented by UE antenna(s) 1240), and/or a UE CSI management module 920-*c*. Each of these components may be in communication with each other, directly or indirectly, over one or more buses 935.

The UE memory module 1220 may include random access memory (RAM) and/or read-only memory (ROM). The UE memory module 1220 may store computer-readable, computer-executable code 1225 containing instructions that are configured to, when executed, cause the UE processor module 1210 to perform various functions described herein related to wireless communication and/or CSI management. Alternatively, the code 1225 may not be directly executable by the UE processor module 1210 but be configured to cause the UE 115-*d* (e.g., when compiled and executed) to perform various of the functions described herein.

The UE processor module 1210 may include an intelligent hardware device, e.g., a central processing unit (CPU), a microcontroller, an ASIC, etc. The UE processor module 1210 may process information received through the UE transceiver module(s) 1230 and/or information to be sent to the UE transceiver module(s) 1230 for transmission through the UE antenna(s) 1240. The UE processor module 1210 may handle, alone or in connection with the UE CSI management module 920-*c*, various aspects of communicating over (or managing communications over) a radio frequency spectrum.

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may support wireless communication using one or more radio access technologies. The UE transceiver module(s) 1230 may be configured to communicate bi-directionally, via the UE antenna(s) 1240, with one or more of the base stations 105 described with reference to FIGS. 1, 7, and/or 8, and/or one or more of the apparatuses 905 configured as a base station, as described with reference to FIGS. 9 and/or 11. While the UE 115-*d* may include a single UE antenna, there may be examples in which the UE 115-*d* may include multiple UE antennas 940.

The UE CSI management module 920-*c* may be configured to perform and/or manage some or all of the features and/or functions described with reference to FIGS. 1, 5, 6, 7, 8, 9, and/or 10 related to CSI management. The UE CSI management module 920-*c*, or portions of it, may include a processor, and/or some or all of the functions of the UE CSI management module 920-*c* may be performed by the UE processor module 1210 and/or in connection with the UE processor module 1210. In some examples, the UE CSI management module 920-*c* may be an example of the CSI management module 920 described with reference to FIGS. 9 and/or 10.

Figure 13:
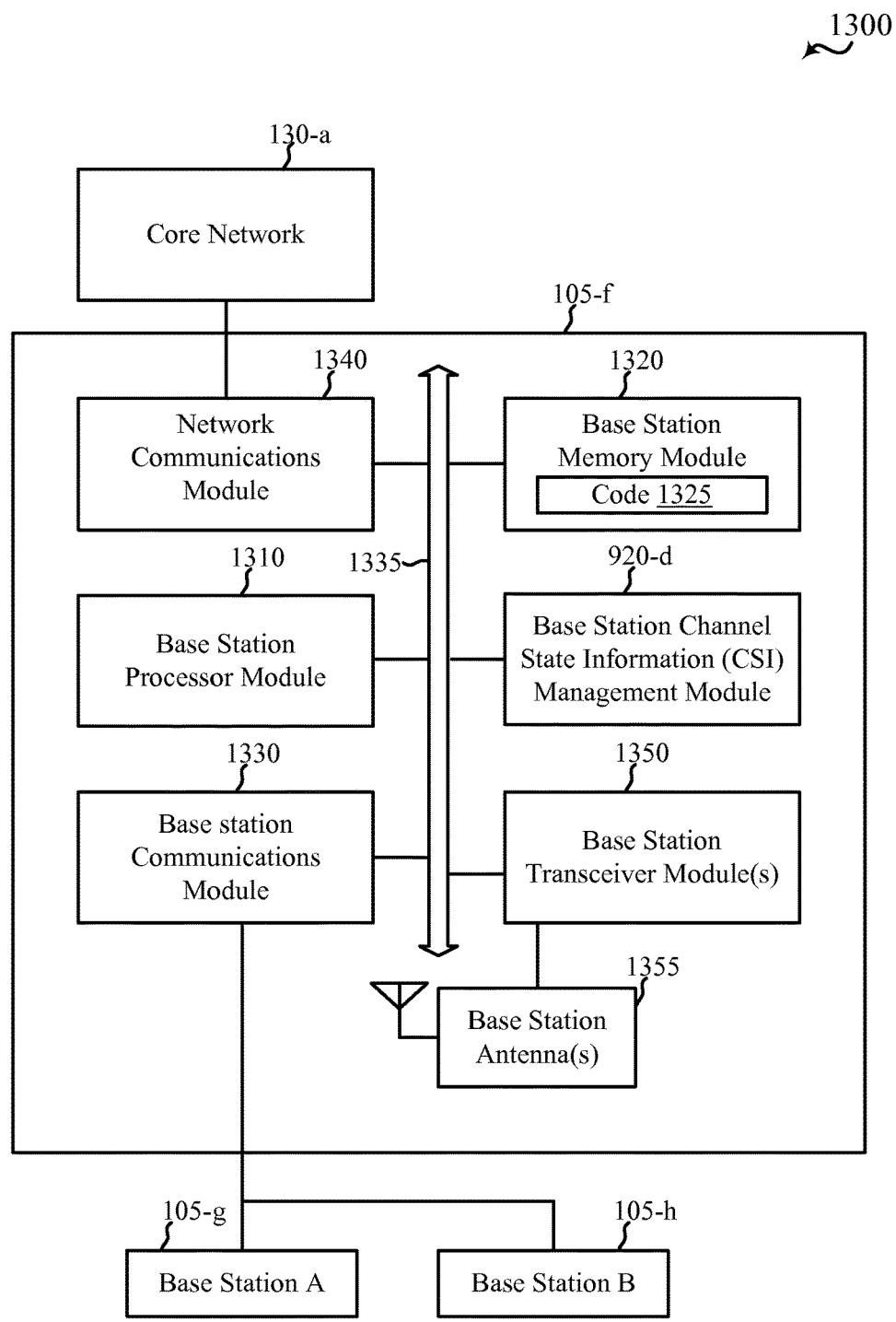
FIG. 13 shows a block diagram of a base station (e.g., a base station forming part or all of an eNB) for use in wireless communication, in accordance with various aspects of the present disclosure.

FIG. 13 shows a block diagram 1300 of a base station 105-*f* (e.g., a base station forming part or all of an eNB) for use in wireless communication, in accordance with various aspects of the present disclosure. In some examples, the base station 105-*f* may be an example of aspects of one or more of the base stations 105 described with reference to FIGS. 1, 2, 7, and/or 8, and/or aspects of one or more of the apparatuses 905 described with reference to FIGS. 9 and/or 11. The base station 105-*f* may be configured to implement or facilitate at least some of the base station and/or apparatus features and functions described with reference to FIGS. 1, 5, 6, 7, 8, 9, and/or 11.

The base station 105-*f* may include a base station processor module 1310, a base station memory module 1320, at least one base station transceiver module (represented by base station transceiver module(s) 1350), at least one base station antenna (represented by base station antenna(s) 1355), and/or a base station CSI management module 920-*d*. The base station 105-*f* may also include one or more of a base station communications module 1330 and/or a network communications module 1340. Each of these components may be in communication with each other, directly or indirectly, over one or more buses 1335.

The base station memory module 1320 may include RAM and/or ROM. The base station memory module 1320 may store computer-readable, computer-executable code 1325 containing instructions that are configured to, when executed, cause the base station processor module 1310 to perform various functions described herein related to wireless communication and/or CSI management. Alternatively, the code 1325 may not be directly executable by the base station processor module 1310 but be configured to cause the base station 105-*f* (e.g., when compiled and executed) to perform various of the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, and/or the network communications module 1340. The base station processor module 1310 may also process information to be sent to the transceiver module(s) 1350 for transmission through the antenna(s) 1355, to the base station communications module 1330, for transmission to one or more other base stations 105-*g* and 105-*h*, and/or to the network communications module 1340 for transmission to a core network 130-*a*, which may be an example of one or more aspects of the core network 130 described with reference to FIG. 1. The base station processor module 1310 may handle, alone or in connection with the base station CSI management module 920-*d*, various aspects of communicating over a radio frequency spectrum.

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications using one or more radio access technologies. The base station transceiver module(s) 1350 may be configured to communicate bi-directionally, via the antenna(s) 1355, with one or more UEs or apparatuses, such as one or more of the UEs 115 described with reference to FIGS. 1, 2, 7, 8, and/or 12, and/or one or more of the apparatuses 905 configured as a UE, as described with reference to FIGS. 9 and/or 10. The base station 105-*f* may, for example, include multiple base station antennas 1355 (e.g., an antenna array). The base station 105-*f* may communicate with the core network 130-*a* through the network communications module 1340. The base station 105-*f* may also communicate with other base stations, such as the base stations 105-*g* and 105-*h*, using the base station communications module 1330.

The base station CSI management module 920-*d* may be configured to perform and/or manage some or all of the features and/or functions described with reference to FIGS. 1, 5, 6, 7, 8, 9, and/or 11 related to CSI management. The base station CSI management module 920-*d*, or portions of it, may include a processor, and/or some or all of the functions of the base station CSI management module 920-*d* may be performed by the base station processor module 1310 and/or in connection with the base station processor module 1310. In some examples, the base station CSI management module 920-*d* may be an example of the CSI management module 920 described with reference to FIGS. 9 and/or 11.

Figure 14:
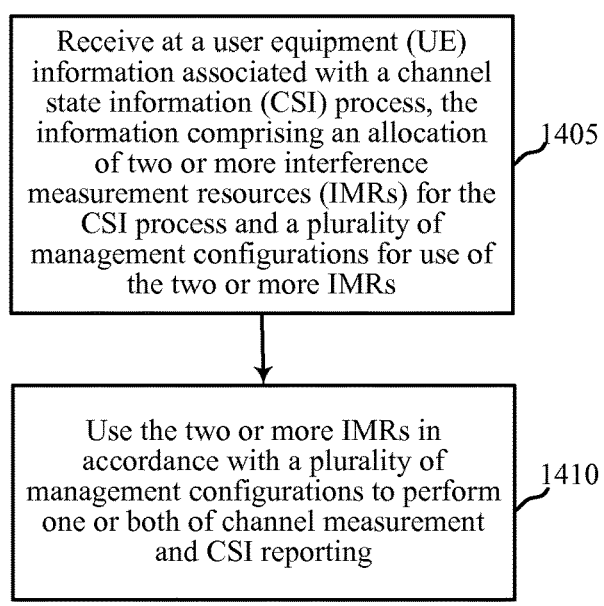
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 2, 7, 8, and/or 12, and/or aspects of one or more of the apparatuses 905 configured as a UE, as described with reference to FIGS. 9 and/or 10. In some examples, a UE or apparatus may execute one or more sets of codes to control the functional elements of the UE or apparatus to perform the functions described below.

At block 1405, the method 1400 may include receiving at a UE information associated with two or more IMRs for a CSI process. The information may include an allocation of two or more IMRs for a CSI process and a plurality of management configurations for use of the two or more IMRs. At least one of the plurality of management configurations may be separately indicated (e.g., separately configured, separately managed) for the two or more IMRs. The operation(s) at block 1405 may be performed using the CSI management module 920 described with reference to FIGS. 9, 10, and/or 12, the CSI process management module 1005, and/or the IMR management module 1010 described with reference to FIG. 10. The allocation of the two or more IMRs for the CSI process and the plurality of management configurations may be received with a transmission of one or more messages or multiple transmissions of one or messages from a base station such as the base station 105 described with reference to FIGS. 1, 2, 7, 8, and/or 13.

In some examples of the method 1400, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter.

At block 1410, the method 1400 may include using the two or more IMRs in accordance with the plurality of management configurations to perform channel measurement and/or CSI reporting. The operation(s) at block 1410 may be performed using the CSI management module 920 described with reference to FIGS. 9, 10, and/or 12, and/or the channel measurement module 1015 or the CSI reporting module 1020 described with reference to FIG. 10.

In some examples of the method 1400, at least two of the two or more IMRs for the CSI process may be configured in overlapped subframes. In some examples, the method 1400 may include receiving a downlink control channel to trigger the CSI reporting. In some examples, the method 1400 may be repeated for each of a plurality of CSI processes. In some examples, a UE or apparatus performing the method 1400 may be configured to use eIMTA and/or NAICS operations (or other frameworks in which two or more IMRs may be allocated to a single CSI process).

The method 1400 may provide for wireless communication. It should be noted that the method 1400 is just one implementation and that the operations of the method 1400 may be rearranged or otherwise modified such that other implementations are possible.

Figure 15:
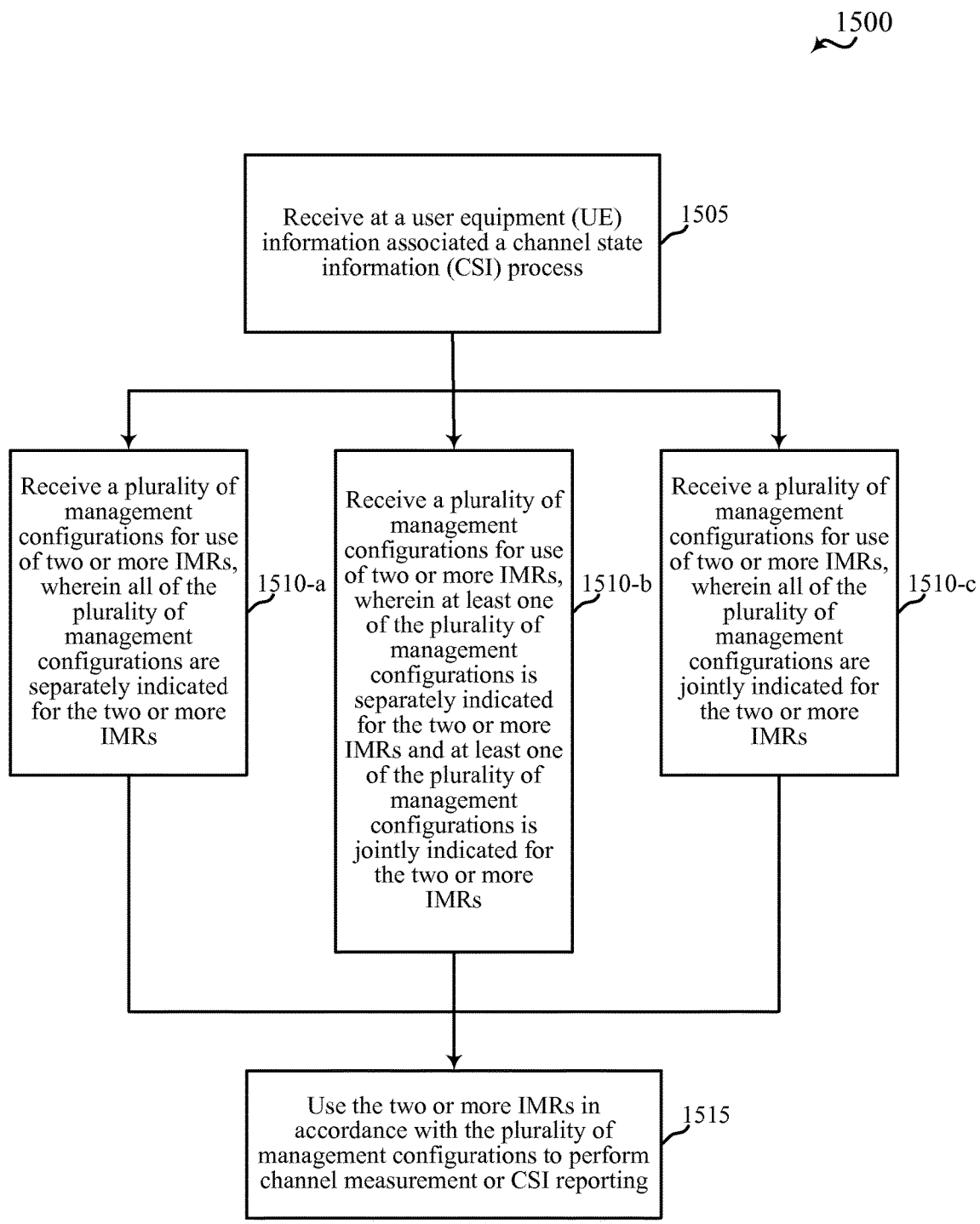
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1, 2, 7, 8, and/or 12, and/or aspects of one or more of the apparatuses 905 configured as a UE, as described with reference to FIGS. 9 and/or 10. In some examples, a UE or apparatus may execute one or more sets of codes to control the functional elements of the UE or apparatus to perform the functions described below.

At block 1505, the method 1500 may include receiving at a UE information associated with a CSI process. The information may include an allocation of two or more IMRs for a CSI process and a plurality of management configurations for use of the two or more IMRs. The operation(s) at block 1505 may be performed using the CSI management module 920 described with reference to FIGS. 9, 10, and/or 12, the CSI process management module 1005, and/or the IMR management module 1010 described with reference to FIG. 10. The information may be received with a transmission of one or more messages or multiple transmissions of one or messages from a base station such as the base station 105 described with reference to FIGS. 1, 2, 7, 8, and/or 13.

At block 1510-*a*, 1510-*b*, and/or 1510-*c*, the method 1500 may include receiving a plurality of management configurations for use of the two or more IMRs with an indication of whether the two or more IMRs are separately or jointly managed with the management configurations. At block 1510-*a*, and in some embodiments, all of the plurality of management configurations may be separately indicated (e.g., separately configured, separately managed) for the two or more IMRs. At block 1510-*b*, and in some embodiments, at least one of the plurality of management configurations may be separately indicated for the two or more IMRs, and at least one of the plurality of management configurations may be jointly indicated for the two or more IMRs. At block 1510-*c*, and in some embodiments, all of the plurality of management configurations may be jointly indicated for the two or more IMRs. The operation(s) at block 1510 may be performed using the CSI management module 920 described with reference to FIGS. 9, 10, and/or 12, and/or the IMR management module 1010 described with reference to FIG. 10. The plurality of management configurations may be received with a transmission of one or more messages or multiple transmissions of one or more messages from a base station such as the base station 105 described with reference to FIGS. 1, 2, 7, 8, and/or 13.

In some examples of the method 1500, the plurality of management configurations may include a CSI reporting mode, a CQI table, an EPRE ratio (e.g., a PO, and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter.

In some examples of the operation(s) at block 1510-*b*, the plurality of management configurations may include 1) a CSI reporting mode, a CQI table, and a reporting restriction parameter that are separately indicated for the two or more IMRs, and 2) an EPRE ratio that is jointly indicated for the two or more IMRs. In other examples, the plurality of management configurations may include 1) a CSI reporting mode that is separately indicated for the two or more IMRs, and 2) a CQI table, an EPRE ratio and a reporting restriction parameter that are jointly indicated for the two or more IMRs.

At block 1515, the method 1500 may include using the two or more IMRs in accordance with the plurality of management configurations to perform channel measurement and/or CSI reporting. The operation(s) at block 1515 may be performed using the CSI management module 920 described with reference to FIGS. 9, 10, and/or 12, and/or the channel measurement module 1015 or the CSI reporting module 1020 described with reference to FIG. 10.

In some examples of the method 1500, at least two of the two or more IMRs for the CSI process may be configured in overlapped subframes. In some examples, the method 1500 may include receiving a downlink control channel to trigger the CSI reporting.

Blocks 1510-*a*, 1510-*b*, and 1510-*c* may be different possible embodiments. However, in some examples, a UE may receive CSI processes via more than one of blocks 1510-*a*, 1510-*b*, and 1510-*c*. For example, the method 1500 may be repeated for each of a plurality of CSI processes, and the plurality of management configurations for different ones of the CSI processes may be received in accordance with the same or different ones of the blocks 1510-*a*, 1510-*b*, and 1510-*c*.

In some examples, a UE or apparatus performing the method 1500 may be configured to use eIMTA and/or NAICS operations (or other frameworks in which two or more IMRs may be allocated to a single CSI process).

The method 1500 may provide for wireless communication. It should be noted that the method 1500 is just one implementation and that the operations of the method 1500 may be rearranged or otherwise modified such that other implementations are possible.

Figure 16:
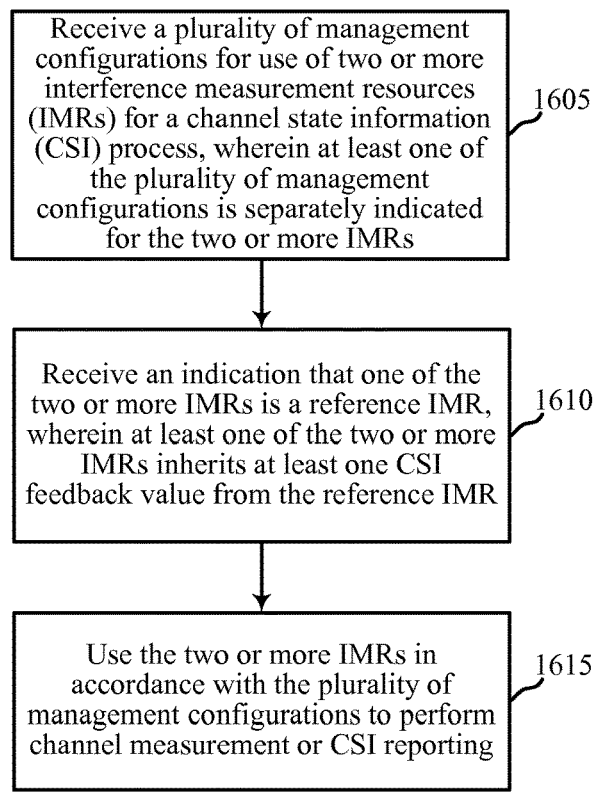
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115 described with reference to FIGS. 1, 2, 7, 8, and/or 12, and/or aspects of one or more of the apparatuses 905 configured as a UE, as described with reference to FIGS. 9 and/or 10. In some examples, a UE or apparatus may execute one or more sets of codes to control the functional elements of the UE or apparatus to perform the functions described below.

At block 1605, the method 1600 may include receiving a plurality of management configurations for use of two or more IMRs for a CSI process. At least one of the plurality of management configurations may be separately indicated (e.g., separately configured, separately managed) for the two or more IMRs. The operation(s) at block 1605 may be performed using the CSI management module 920 described with reference to FIGS. 9, 10, and/or 12, and/or the IMR management module 1010 described with reference to FIG. 10. The plurality of management configurations may be received with a transmission of one or more messages or multiple transmissions of one or messages from a base station such as the base station 105 described with reference to FIGS. 1, 2, 7, 8, and/or 13.

In some examples of the method 1600, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by the UE. In some embodiments, the reporting restriction parameter may be a codebookSubsetRestriction parameter.

At block 1610, the method 1600 may include receiving an indication that one of the two or more IMRs is a reference IMR. In some examples, at least one of the two or more IMRs may inherit at least one CSI feedback value from the reference IMR. In some examples, the at least one CSI feedback value inherited from the reference IMR may include a rank (e.g., an RI) and/or a CSI reporting mode. In some examples, a reference IMR may be employed when two or more IMRs for a CSI process are indicated to have the same CSI reporting mode. The operation(s) at block 1610 may be performed using the CSI management module 920 described with reference to FIGS. 9, 10, and/or 12, and/or the IMR management module 1010 described with reference to FIG. 10.

At block 1615, the method 1600 may include using the two or more IMRs in accordance with the plurality of management configurations to perform channel measurement and/or CSI reporting. The operation(s) at block 1615 may be performed using the CSI management module 920 described with reference to FIGS. 9, 10, and/or 12, and/or the channel measurement module 1015 or the CSI reporting module 1020 described with reference to FIG. 10.

In some examples of the method 1600, at least two of the two or more IMRs for the CSI process may be configured in overlapped subframes. In some examples, the method 1600 may include receiving a downlink control channel to trigger the CSI reporting. In some examples, the method 1600 may be repeated for each of a plurality of CSI processes. In some examples, a UE or apparatus performing the method 1600 may be configured to use eIMTA and/or NAICS operations (or other frameworks in which two or more IMRs may be allocated to a single CSI process).

The method 1600 may provide for wireless communication. It should be noted that the method 1600 is just one implementation and that the operations of the method 1600 may be rearranged or otherwise modified such that other implementations are possible. In some examples, one or more aspects of the methods 1400, 1500, and/or 1600 may be combined.

In some examples, an apparatus for wireless communication may be configured to implement the methods. The apparatus may include means for receiving at a UE information associated with a CSI process, the information comprising an allocation of two or more IMRs for the CSI process and a plurality of management configurations for use of the two or more IMRs and means for using the two or more IMRs in accordance with the plurality of management configurations to perform one or both of channel measurement and CSI reporting. At least one of the plurality of management configurations is separately indicated for the two or more IMRs. In some cases, the plurality of management configurations is separately indicated for the two or more IMRs. In other cases, at least one of the plurality of management configurations is separately indicated for the two or more IMRs and at least one of the plurality of management configurations is jointly indicated for the two or more IMRs.

Figure 17:
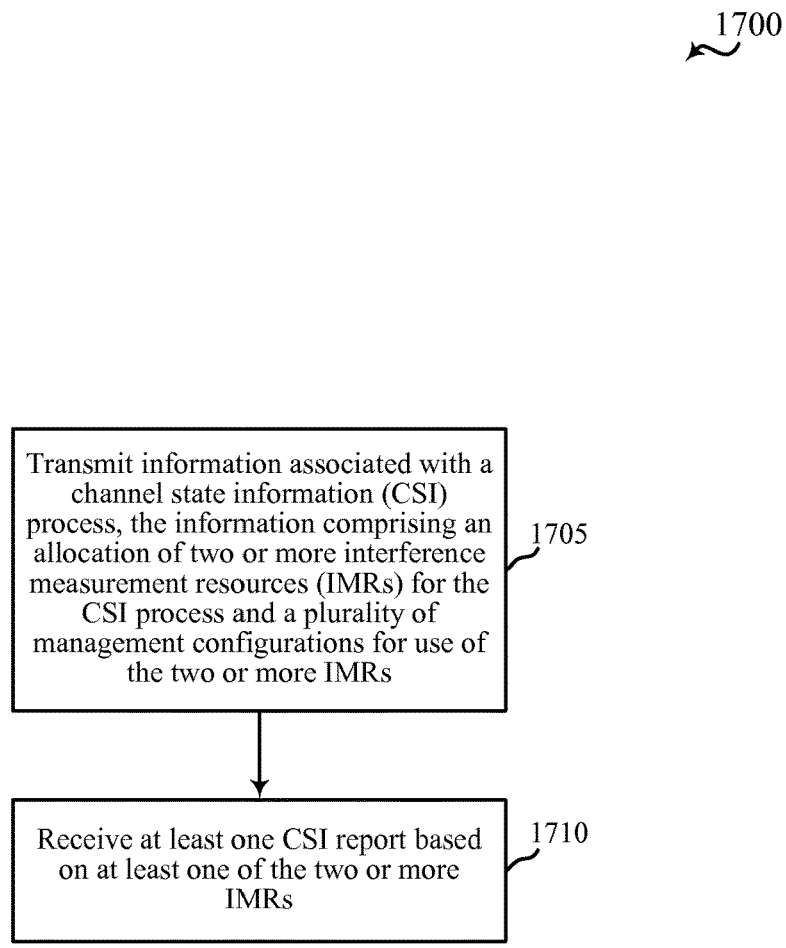
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105 (or eNBs including a base station) described with reference to FIGS. 1, 2, 7, 8, and/or 13, and/or aspects of one or more of the apparatuses 905 configured as a base station or eNB, as described with reference to FIGS. 9 and/or 11. In some examples, a base station, eNB, or apparatus may execute one or more sets of codes to control the functional elements of the base station, eNB, or apparatus to perform the functions described below.

At block 1705, the method 1700 may include transmitting (e.g., from a base station or eNB to a UE) information associated with a CSI process, the information comprising an allocation of two or more IMRs for the CSI process and a plurality of management configurations for use of the two or more IMRs. The operation(s) at block 1705 may be performed using the CSI management module 920 described with reference to FIGS. 9, 11, and/or 13, the CSI process management module 1105, and/or the IMR management module 1110 described with reference to FIG. 11. The transmission of the information may be performed with a transmission of one or more messages or multiple transmissions of one or more messages to the UE.

In some examples of the method 1700, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by a UE. In some embodiments, the reporting restriction parameter may be a codebookSubsetRestriction parameter.

At block 1710, the method 1700 may include receiving at least one CSI report based on at least one of the two or more IMRs. The operation(s) at block 1710 may be performed using the CSI management module 920 described with reference to FIGS. 9, 11, and/or 13, and/or the CSI report reception and/or analysis module 1115 described with reference to FIG. 11.

In some examples of the method 1700, at least two of the two or more IMRs for the CSI process may be configured in overlapped subframes. In some examples, the method 1700 may include transmitting a downlink control channel (e.g., from a base station or eNB to a UE) to trigger UE transmission of the at least one CSI report. In some examples, the method 1700 may be repeated for each of a plurality of CSI processes.

In some examples, a base station, eNB, or apparatus performing the method 1700 may be configured to use eIMTA and/or NAICS operations (or other frameworks in which two or more IMRs may be allocated to a single CSI process).

The method 1700 may provide for wireless communication. It should be noted that the method 1700 is just one implementation and that the operations of the method 1700 may be rearranged or otherwise modified such that other implementations are possible.

Figure 18:
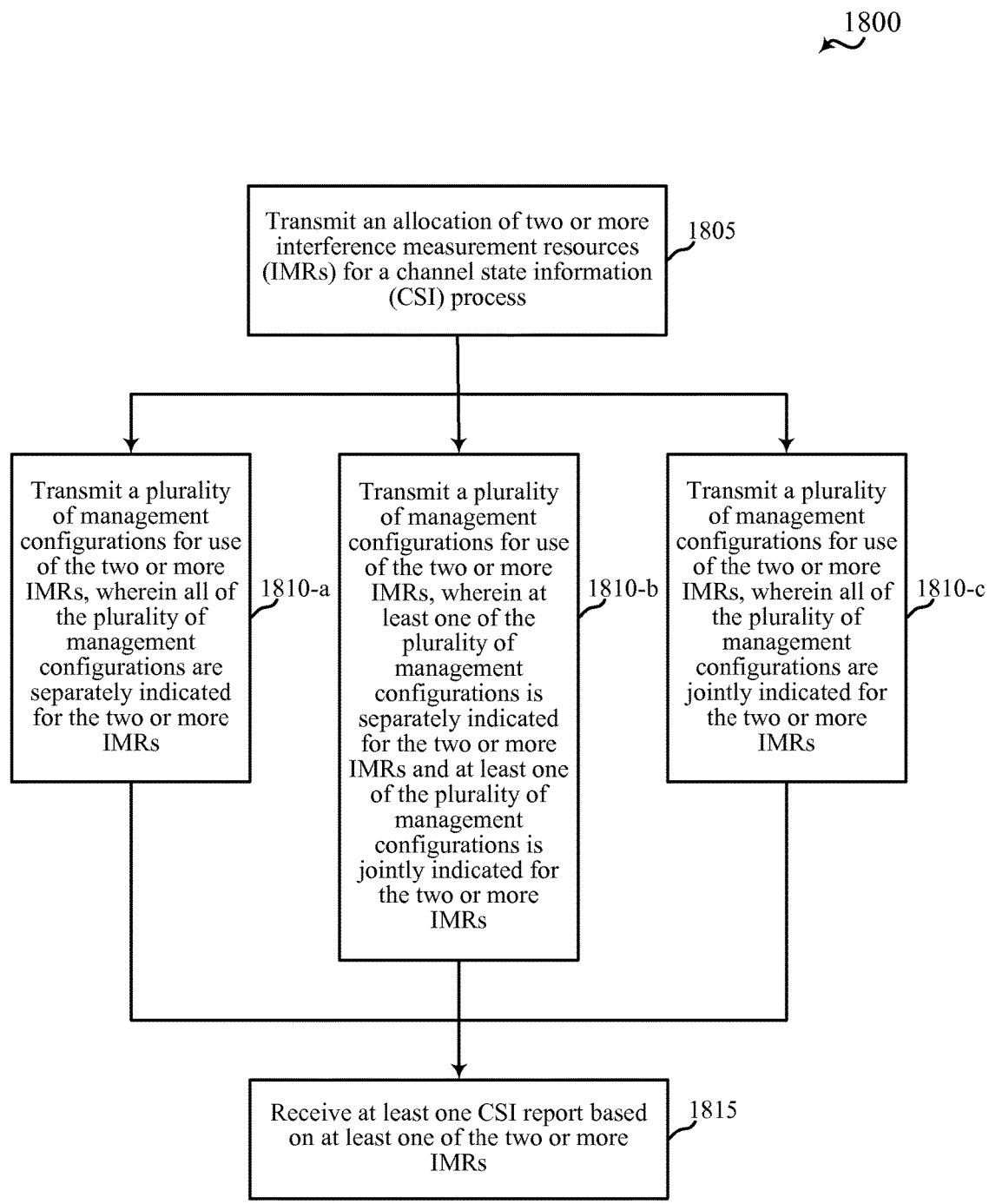
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105 (or eNBs including a base station) described with reference to FIGS. 1, 2, 7, 8, and/or 13, and/or aspects of one or more of the apparatuses 705 configured as a base station or eNB, as described with reference to FIGS. 9 and/or 11. In some examples, a base station, eNB, or apparatus may execute one or more sets of codes to control the functional elements of the base station, eNB, or apparatus to perform the functions described below.

At block 1805, the method 1800 may include transmitting (e.g., from a base station or eNB to a UE) information associated with a CSI process. The information may include an allocation of two or more IMRs for the CSI process and a plurality of management configurations for use of the two or more IMRs. The operation(s) at block 1805 may be performed using the CSI management module 920 described with reference to FIGS. 9, 11, and/or 13, and/or the CSI process management module 1105, and/or the IMR management module 1110 described with reference to FIG. 11. The transmission of the information may be performed with a transmission of one or more messages or multiple transmissions of one or more messages to the UE.

At block 1810, the method 1800 may include transmitting (e.g., from a base station or eNB to a UE) the plurality of management configurations for use of the two or more IMRs with an indication whether the two or more IMRs are separately or jointly managed with the management configurations. At block 1810-a, and in some embodiments, all of the plurality of management configurations may be separately indicated (e.g., separately configured, separately managed) for the two or more IMRs. At block 1810-b, and in some embodiments, at least one of the plurality of management configurations may be separately indicated for the two or more IMRs, and at least one of the plurality of management configurations may be jointly indicated for the two or more IMRs. At block 1810-*c*, and in some embodiments, all of the plurality of management configurations may be jointly indicated for the two or more IMRs. The operation(s) at block 1810 may be performed using the CSI management module 920 described with reference to FIGS. 9, 11, and/or 13, and/or the IMR management module 1110 described with reference to FIG. 11. The transmission of the plurality of management configurations for use of the two or more IMRs may be performed with a transmission of one or more messages or multiple transmissions of one or more messages to the UE.

In some examples of the method 1800, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by a UE. In some embodiments, the reporting restriction parameter may be a codebookSubsetRestriction parameter.

In some examples of the operation(s) at block 1810-*b*, the plurality of management configurations may include 1) a CSI reporting mode, a CQI table, and a reporting restriction parameter that are separately indicated for the two or more IMRs, and 2) an EPRE ratio that is jointly indicated for the two or more IMRs. In other examples, the plurality of management configurations may include 1) a CSI reporting mode that is separately indicated for the two or more IMRs, and 2) a CQI table, an EPRE ratio and a reporting restriction parameter that are jointly indicated for the two or more IMRs.

At block 1815, the method 1800 may include receiving at least one CSI report based on at least one of the two or more IMRs. The operation(s) at block 1815 may be performed using the CSI management module 920 described with reference to FIGS. 9, 11, and/or 13, and/or the CSI report reception and/or analysis module 1115 described with reference to FIG. 11.

In some examples of the method 1800, at least two of the two or more IMRs for the CSI process may be configured in overlapped subframes. In some examples, the method 1800 may include transmitting a downlink control channel (e.g., from a base station or eNB to a UE) to trigger UE transmission of the at least one CSI report.

Blocks 1810-*a*, 1810-*b*, and 1810-*c* may be different possible embodiments. However, in some examples, CSI processes may be transmitted via more than one of blocks 1810-*a*, 1810-*b*, and 1810-*c*. For example, the method 1800 may be repeated for each of a plurality of CSI processes, and the plurality of management configurations for different ones of the CSI processes may be transmitted in accordance with the same or different ones of the blocks 1810-*a*, 1810-*b*, and 1810-*c*.

In some examples, a base station, eNB, or apparatus performing the method 1800 may be configured to use eIMTA and/or NAICS operations (or other frameworks in which two or more IMRs may be allocated to a single CSI process).

The method 1800 may provide for wireless communication. It should be noted that the method 1800 is just one implementation and that the operations of the method 1800 may be rearranged or otherwise modified such that other implementations are possible.

Figure 19:
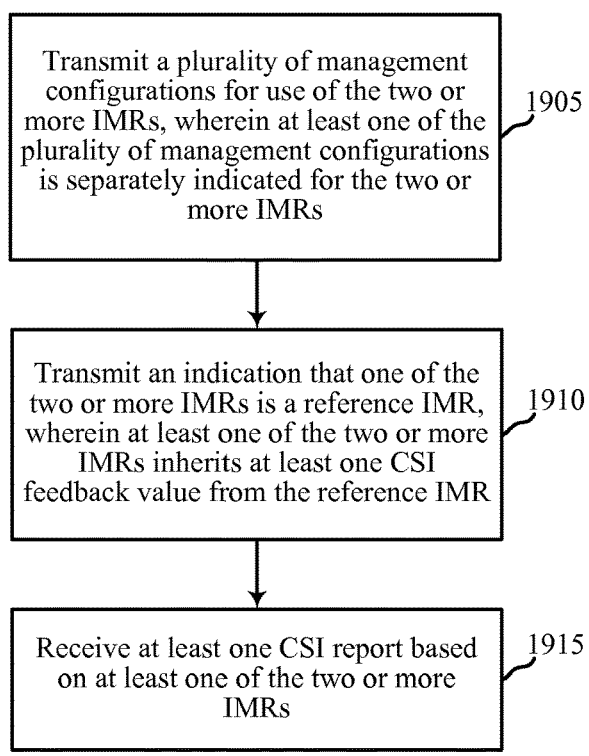
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the base stations 105 (or eNBs including a base station) described with reference to FIGS. 1, 2, 7, 8, and/or 13, and/or aspects of one or more of the apparatuses 905 configured as a base station or eNB, as described with reference to FIGS. 9 and/or 11. In some examples, a base station, eNB, or apparatus may execute one or more sets of codes to control the functional elements of the base station, eNB, or apparatus to perform the functions described below.

At block 1905, the method 1900 may include transmitting (e.g., from a base station or eNB to a UE) a plurality of management configurations for use of the two or more IMRs. At least one of the plurality of management configurations may be separately indicated (e.g., separately configured, separately managed) for the two or more IMRs. The operation(s) at block 1910 may be performed using the CSI management module 920 described with reference to FIGS. 9, 11, and/or 13, and/or the IMR management module 1110 described with reference to FIG. 11. The transmission of the plurality of management configurations may be performed with a transmission of one or more messages or multiple transmissions of one or more messages to the UE.

In some examples of the method 1900, the plurality of management configurations may include a CSI reporting mode, a CQI table, an EPRE ratio (e.g., a $P_c$), and/or a reporting restriction parameter. The EPRE ratio may be a ratio of PDSCH EPRE to CSI-RS EPRE. The reporting restriction parameter may be a parameter that restricts a set of vectors and/or ranks that are reportable by a UE. In some embodiments, the reporting restriction parameter may be a codebookSubsetRestriction parameter.

At block 1910, the method 1900 may include transmitting an indication that one of the two or more IMRs is a reference IMR. In some examples, at least one of the two or more IMRs may inherit at least one CSI feedback value from the reference IMR. In some examples, the at least one CSI feedback value inherited from the reference IMR may include a rank (e.g., an RI) and/or a CSI reporting mode. In some examples, a reference IMR may be employed when two or more IMRs for a CSI process are indicated to have the same CSI reporting mode. The operation(s) at block 1910 may be performed using the CSI management module 920 described with reference to FIGS. 9, 11, and/or 13, and/or the IMR management module 1110 described with reference to FIG. 11.

At block 1920, the method 1900 may include receiving at least one CSI report based on at least one of the two or more IMRs. The operation(s) at block 1920 may be performed using the CSI management module 920 described with reference to FIGS. 9, 11, and/or 13, and/or the CSI report reception and/or analysis module 1115 described with reference to FIG. 11.

In some examples of the method 1900, at least two of the two or more IMRs for the CSI process may be configured in overlapped subframes. In some examples, the method 1900 may include transmitting a downlink control channel (e.g., from a base station or eNB to a UE) to trigger UE transmission of the at least one CSI report. In some examples, the method 1900 may be repeated for each of a plurality of CSI processes. In some examples, a base station, eNB, or apparatus performing the method 1900 may be configured to use eIMTA and/or NAICS operations (or other frameworks in which two or more IMRs may be allocated to a single CSI process).

The method 1900 may provide for wireless communication. It should be noted that the method 1900 is just one implementation and that the operations of the method 1900 may be rearranged or otherwise modified such that other implementations are possible. In some examples, one or more aspects of the methods 1700, 1800, and/or 1900 may be combined.

In some examples, an apparatus for wireless communication may be configured to implement the methods. The apparatus may comprise means for transmitting information associated with a CSI process, the information comprising an allocation of two or more IMRs for the CSI process and a plurality of management configurations for use of the two or more IMRs, and means for receiving at least one CSI report based on at least one of the two or more IMRs. At least one of the plurality of management configurations is separately indicated (e.g., separately configured, separately managed) for the two or more IMRs. In other examples, the plurality of management configurations is separately indicated for the two or more IMRs. In other examples, at least one of the plurality of management configurations is separately indicated for the two or more IMRs and at least one of the plurality of management configurations is jointly indicated for the two or more IMRs. The plurality of management configurations includes a CSI reporting mode, a CQI table, an EPRE ratio, and a reporting restriction parameter.

In some examples, the apparatus may further comprise means for transmitting an indication that one of the two or more IMRs is a reference IMR. In some examples, at least one of the two or more IMRs inherits at least one CSI feedback value from the reference IMR. In some examples, the apparatus may be configured to use one or both of eIMTA and NAICS operations. In some examples, the apparatus may further comprise means for transmitting a downlink control channel to trigger a transmission of the at least one CSI report by a UE.

In some examples, another apparatus for wireless communication may be configured to implement the methods. The apparatus may comprise a processor, memory in electronic communication with the processor, and instructions stored in the memory. The instructions may be executable by the processor to transmit information associated with a CSI process, the information comprising an allocation of two or more IMRs for the CSI process and a plurality of management configurations for use of the two or more IMRs, and to receive at least one CSI report based on at least one of the two or more IMRs. At least one of the plurality of management configurations may be separately indicated (e.g., separately configured, separately managed) for the two or more IMRs. In some examples, all of the plurality of management configurations may be jointly indicated for the two or more IMRs. In other examples, at least one of the plurality of management configurations is separately indicated for the two or more IMRs and at least one of the plurality of management configurations is jointly indicated for the two or more IMRs. The plurality of management configurations includes a CSI reporting mode, a CQI table, an EPRE ratio, and a reporting restriction parameter.

In some examples, the instructions may be further executable by the process to transmit an indication that one of the two or more IMRs is a reference IMR. In some examples, at least one of the two or more IMRs may inherit at least one CSI feedback value from the reference IMR. In some examples, the apparatus may be configured to use one or both of eIMTA and NAICS operations. In some examples, the instructions may be further executable by the processor to transmit a downlink control channel to trigger a transmission of at least one CSI report by a UE.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
  receiving at a user equipment (UE) information associated with a channel state information (CSI) process, the information comprising an allocation of two or more interference measurement resources (IMRs) for the CSI process with each IMR having a corresponding plurality of management configurations, wherein a first codebookSubsetRestriction parameter from a first plurality of management configurations associated with a first IMR is separately indicated from a second codebookSubsetRestriction parameter from a second plurality of management configurations associated with a second IMR; and
  using the two or more IMRs in accordance with the plurality of management configurations to perform one or both of channel measurement and CSI reporting.

2. The method of claim 1, wherein all of the plurality of management configurations associated with the first IMR are separately indicated from all of the plurality of management configurations associated with the second IMR.

3. The method of claim 1, wherein at least one additional management configuration of the first plurality of management configurations associated with the first IMR is separately indicated from a corresponding additional management configuration of the second plurality of management configurations associated with the second IMR while at least another management configuration of the first plurality of management configurations associated with the first IMR is jointly indicated with a corresponding management configuration of the second plurality of management configurations associated with the second IMR.

4. The method of claim 1, wherein the plurality of management configurations further includes a CSI reporting mode, a channel quality indication (CQI) table, and an energy per resource element (EPRE) ratio.

5. The method of claim 4, wherein the EPRE ratio is a ratio of physical downlink shared channel (PDSCH) EPRE to channel state information reference signal (CSI-RS) EPRE.

6. The method of claim 1, wherein the first IMR corresponds to a first subframe set and the second IMR corresponds to a second subframe set, the first and second subframe sets being associated with the CSI process.

7. The method of claim 1, wherein the plurality of management configurations are associated with a downlink transmission mode configured for the UE.

8. The method of claim 1, further comprising:
  receiving an indication that one of the two or more IMRs is a reference IMR.

9. The method of claim 1, wherein the UE is configured to use one or both of evolved interference management for traffic adaptation (eIMTA) and network assisted interference cancellation and suppression (NAICS) operations.

10. The method of claim 1, wherein using the two or more IMRs in accordance with the plurality of management configurations comprises using the two or more IMRs in accordance with the plurality of management configurations to perform CSI reporting in transmission mode 10.

11. An apparatus for wireless communication, comprising:
  a processor;
  memory in electronic communication with the processor; and
  instructions stored in the memory, the instructions being executable by the processor to:
  receive at a user equipment (UE) information associated with a channel state information (CSI) process, the information comprising an allocation of two or more interference measurement resources (IMRs) for the CSI process with each IMR having a corresponding plurality of management configurations, wherein a first codebookSubsetRestriction parameter from a first plurality of management configurations associated with a first IMR is separately indicated from a second codebookSubsetRestriction parameter from a second plurality of management configurations associated with a second IMR; and
  use the two or more IMRs in accordance with the plurality of management configurations to perform one or both of channel measurement and CSI reporting.

12. The apparatus of claim 11, wherein all of the plurality of management configurations associated with the first IMR are separately indicated from all of the plurality of management configurations associated with the second IMR.

13. The apparatus of claim 11, wherein at least one additional management configuration of the first plurality of management configurations associated with the first IMR is separately indicated from a corresponding additional management configuration of the second plurality of management configurations associated with the second IMR while at least another management configuration of the first plurality of management configurations associated with the first IMR is jointly indicated with a corresponding management configuration of the second plurality of management configurations associated with the second IMR.

14. The apparatus of claim 11, wherein the plurality of management configurations further includes a CSI reporting mode, a channel quality indication (CQI) table, and an energy per resource element (EPRE) ratio.

15. The apparatus of claim 11, wherein the first IMR corresponds to a first subframe set and the second IMR corresponds to a second subframe set, the first and second subframe sets being associated with the CSI process.

16. The apparatus of claim 11, wherein the plurality of management configurations are associated with a downlink transmission mode configured for the UE.

17. The apparatus of claim 11, wherein the instructions are executable by the processor to:
  receive an indication that one of the two or more IMRs is a reference IMR.

18. The apparatus of claim 11, wherein the UE is configured to use one or both of evolved interference management for traffic adaptation (eIMTA) and network assisted interference cancellation and suppression (NAICS) operations.

19. A non-transitory computer-readable medium storing instructions executable by a processor to:
  receive at a user equipment (UE) information associated with a channel state information (CSI) process, the information comprising an allocation of two or more interference measurement resources (IMRs) for the CSI process with each IMR having a corresponding plurality of management configurations, wherein a first codebookSubsetRestriction parameter from a first plurality of management configurations associated with a first IMR is separately indicated from a second codebookSubsetRestriction parameter from a second plurality of management configurations associated with a second IMR; and
  use the two or more IMRs in accordance with the plurality of management configurations to perform one or both of channel measurement and CSI reporting.

20. The non-transitory computer-readable medium of claim 19, wherein all of the plurality of management configurations associated with the first IMR are separately indicated from all of the plurality of management configurations associated with the second IMR.

21. The non-transitory computer-readable medium of claim 19, wherein at least one additional management configuration of the first plurality of management configurations associated with the first IMR is separately indicated from a corresponding additional management configuration of the second plurality of management configurations associated with the second IMR while at least another management configuration of the first plurality of management configurations associated with the first IMR is jointly indicated with a corresponding management configuration of the second plurality of management configurations associated with the second IMR.

22. The non-transitory computer-readable medium of claim 19, wherein the plurality of management configurations further includes a CSI reporting mode, a channel quality indication (CQI) table, and an energy per resource element (EPRE) ratio.

23. The non-transitory computer-readable medium of claim 19, wherein the first IMR corresponds to a first subframe set and the second IMR corresponds to a second subframe set, the first and second subframe sets being associated with the CSI process.

24. The non-transitory computer-readable medium of claim 19, wherein the plurality of management configurations are associated with a downlink transmission mode configured for the UE.

25. The non-transitory computer-readable medium of claim 19, wherein the instructions are executable by the processor to:
  receive an indication that one of the two or more IMRs is a reference IMR.

26. A method for wireless communication, comprising:
  transmitting information associated with a channel state information (CSI) process, the information comprising an allocation of two or more interference measurement resources (IMRs) for the CSI process with each IMR having a corresponding plurality of management configurations, wherein a first codebookSubsetRestriction parameter from a first plurality of management configurations associated with a first IMR is separately indicated from a second codebookSubsetRestriction parameter from a second plurality of management configurations associated with a second IMR; and
  receiving at least one CSI report based on at least one of the two or more IMRs.

27. The method of claim 26, wherein all of the plurality of management configurations associated with the first IMR are separately indicated from all of the plurality of management configurations associated with the second IMR.

28. The method of claim 26, wherein at least one additional management configuration of the first plurality of management configurations associated with the first IMR is separately indicated from a corresponding additional management configuration of the second plurality of management configurations associated with the second IMR while at least another management configuration of the first plurality of management configurations associated with the first IMR is jointly indicated with a corresponding management configuration of the second plurality of management configurations associated with the second IMR.

29. The method of claim 26, wherein the plurality of management configurations further includes a CSI reporting mode, a channel quality indication (CQI) table, and an energy per resource element (EPRE) ratio.

30. The method of claim 26, further comprising:
  transmitting an indication that one of the two or more IMRs is a reference IMR.

* * * * *